United States Patent
Pope et al.

(10) Patent No.: US 11,537,541 B2
(45) Date of Patent: Dec. 27, 2022

(54) NETWORK INTERFACE DEVICE AND HOST PROCESSING DEVICE

(71) Applicant: Xilinx, Inc., San Jose, CA (US)

(72) Inventors: Steven Leslie Pope, Cambridge (GB); David James Riddoch, Fenstanton (GB)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/511,706

(22) Filed: Jul. 15, 2019

(65) Prior Publication Data

US 2020/0104269 A1  Apr. 2, 2020

Related U.S. Application Data

(63) Continuation-in-part of application No. 16/146,128, filed on Sep. 28, 2018.

(51) Int. Cl.
*G06F 13/20* (2006.01)
*G06F 13/40* (2006.01)

(52) U.S. Cl.
CPC .......... *G06F 13/20* (2013.01); *G06F 13/4027* (2013.01)

(58) Field of Classification Search
None
See application file for complete search history.

(56) References Cited

U.S. PATENT DOCUMENTS

| | | | |
|---|---|---|---|
| 6,598,063 B1 | 7/2003 | Tang et al. | |
| 7,376,125 B1 | 5/2008 | Hussain et al. | |
| 7,382,787 B1 | 6/2008 | Barnes et al. | |
| 7,861,067 B1 | 12/2010 | Chayut | |
| 7,917,876 B1 * | 3/2011 | Schumacher | G06F 30/34 716/116 |
| 8,181,024 B2 | 5/2012 | Nagai et al. | |
| 9,450,945 B1 * | 9/2016 | Koeten | H04L 41/022 |
| 9,832,121 B1 | 11/2017 | Singh et al. | |
| 9,860,258 B1 | 1/2018 | Collins et al. | |
| 9,886,072 B1 | 2/2018 | Venkataraman | |
| 9,940,284 B1 | 4/2018 | Davis et al. | |
| 10,496,593 B1 | 12/2019 | Miller et al. | |
| 10,516,626 B1 | 12/2019 | Kodeboyina et al. | |
| 10,755,024 B1 | 8/2020 | Chow et al. | |
| 11,012,411 B2 | 5/2021 | Pope et al. | |
| 11,082,364 B2 | 8/2021 | Pope et al. | |
| 2001/0003834 A1 | 6/2001 | Shimonishi | |

(Continued)

FOREIGN PATENT DOCUMENTS

EP  2722767 A1  4/2014

OTHER PUBLICATIONS

U.S. Appl. No. 16/146,128, filed Sep. 28, 2018, Pope et al.

(Continued)

*Primary Examiner* — Ajit Patel
*Assistant Examiner* — Pamit Kaur
(74) *Attorney, Agent, or Firm* — Wolf, Greenfield & Sacks, P.C.

(57) ABSTRACT

A network interface device comprises a plurality of components configured to process a flow of data one after another. A control component is configured to provide one or more control messages in said flow, said one or more control message being provided to said plurality of components one after another such that a configuration of one or more of said components is changed.

30 Claims, 12 Drawing Sheets

(56) References Cited

U.S. PATENT DOCUMENTS

| | | |
|---|---|---|
| 2003/0023838 A1 | 1/2003 | Karim et al. |
| 2004/0189650 A1 | 9/2004 | Deering |
| 2005/0159181 A1 | 7/2005 | Gadgil et al. |
| 2006/0117126 A1 | 6/2006 | Leung et al. |
| 2007/0171839 A1* | 7/2007 | Sankala ............... G06F 13/387 370/252 |
| 2007/0214302 A1 | 9/2007 | Kubo et al. |
| 2010/0183011 A1 | 7/2010 | Chao |
| 2010/0229137 A1 | 9/2010 | Liu et al. |
| 2011/0149966 A1 | 6/2011 | Pope et al. |
| 2013/0010600 A1* | 1/2013 | Jocha .................. H04L 43/062 370/236.2 |
| 2013/0044641 A1 | 2/2013 | Koponen et al. |
| 2013/0179485 A1 | 7/2013 | Chapman et al. |
| 2014/0310405 A1* | 10/2014 | Pope .................. H04L 69/326 709/224 |
| 2014/0351526 A1 | 11/2014 | Peterson |
| 2014/0351777 A1 | 11/2014 | Chang et al. |
| 2015/0124827 A1 | 5/2015 | Rangaraman et al. |
| 2015/0131456 A1 | 5/2015 | Allmendinger et al. |
| 2015/0199461 A1 | 7/2015 | Laisne |
| 2015/0205324 A1 | 7/2015 | Havlir et al. |
| 2016/0127275 A1* | 5/2016 | Asa .................... H04L 49/1546 370/412 |
| 2016/0134588 A1 | 5/2016 | Falkowitz et al. |
| 2016/0323216 A1 | 11/2016 | LeVasseur et al. |
| 2017/0180273 A1 | 6/2017 | Daly et al. |
| 2017/0323417 A1* | 11/2017 | Madajczak ........... G06F 1/3225 |
| 2017/0337149 A1 | 11/2017 | Onuki et al. |
| 2018/0219800 A1 | 8/2018 | Huynh et al. |
| 2018/0329644 A1 | 11/2018 | Das et al. |
| 2018/0365358 A1 | 12/2018 | Falkowitz et al. |
| 2019/0005239 A1 | 1/2019 | Falkowitz et al. |
| 2019/0347106 A1* | 11/2019 | Kadowaki ............... G06F 8/70 |
| 2020/0076684 A1 | 3/2020 | Naveen et al. |
| 2020/0106668 A1 | 4/2020 | Pope et al. |
| 2020/0145376 A1 | 5/2020 | Pope et al. |
| 2020/0344180 A1 | 10/2020 | Pope et al. |
| 2021/0258284 A1 | 8/2021 | Pope et al. |
| 2022/0086042 A1 | 3/2022 | Pope et al. |

OTHER PUBLICATIONS

Extended European Search Report for European Application No. EP 19200398.6 dated Jan. 16, 2020.

International Search Report and Written Opinion for International Application No. PCT/EP2019/080281 dated Jan. 30, 2020.

[No Author Listed], CBG-BSV Third-Party Bluespec Compiler. 14 pages. https://www.cl.cam.ac.uk/~djg11/wwwhpr/toy-bluespec-compiler.html [last accessed Apr. 25, 2019].

[No Author Listed], Empowering OVS with eBPF. 4 pages. https://ovsfall2018.sched.com/event/IO7j/empowering-ovs-with-ebpf [last accessed Apr. 25, 2019].

Bershad et al., Extensibility, Safety and Performance in the SPIN Operating System. Department of Computer Science and Engineering. University of Washington. 1995. 17 pages.

Gordon, Programmable hardware for high performance SDN. Optical Fiber Communication Conference, Optical Society of America. Mar. 22, 2015:3 pages.

Li et al., Clicknp: Highly flexible and high performance network processing with reconfigurable hardware. Proceedings of the 2016 ACM SIGCOMM Conference. Aug. 22, 2016:1-14.

McCane et al., The BSD Packet Filter: A New Architecture for User-level Packet Capture. Preprint paper for 1993 Winter USENIX Conference. Dec. 19, 1992. 11 pages.

Mogul et al., The Packet Filter: An Efficient Mechanism for User-level Network Code. Department of Computer Science. Carnegie-Mellon University. Nov. 1987. 34 pages.

Tu et al., Bringing the Power of eBPF to Open vSwitch. Kernel. 2018. 11 pages.

U.S. Appl. No. 16/180,883, filed Nov. 5, 2018, Pope et al.

U.S. Appl. No. 16/395,027, filed Apr. 25, 2019, Pope et al.

PCT/EP2019/080281, Jan. 30, 2020, International Search Report and Written Opinion.

EP 19200398.6, Jan. 16, 2020, Extended European Search Report.

U.S. Appl. No. 17/246,310, filed Apr. 30, 2021, Pope et al.

\* cited by examiner

NETWORK INTERFACE DEVICE AND HOST PROCESSING DEVICE

CROSS REFERENCE TO RELATED APPLICATIONS

This application claims the priority benefit under 35 U.S.C. § 120 as a continuation-in-part of U.S. application Ser. No. 16/146,128, filed Sep. 28, 2018, and titled "NETWORK INTERFACE DEVICE," the entire contents of which are incorporated herein by reference.

FIELD

This application relates to network interface devices and in particular but not exclusively to the configuration of network interface devices.

BACKGROUND

Network interface devices are known and are typically used to provide an interface between a computing device and a network. The network interface device can be configured to process data which is received from the network and/or process data which is to be put on the network.

Increasingly, network interface devices are being provided with more capabilities in terms of processing capacity which may be configured as required by the applications which the network interface device supports.

SUMMARY

According to an aspect, there is provided a network interface device comprising: a plurality of components configured to process a flow of data one after another; a control component configured to provide one or more control messages in said flow, said one or more control message being provided to said plurality of components one after another such that a configuration of one or more of said components is changed.

Each of said plurality of components may be configured to update its configuration in response to said one or more control messages such that data received after the control message in said flow is processed by the respective component with its updated configuration.

The control component may be configured to receive a request and in response thereto to configure one or more components.

The control component may be configured to allocate one or more of said components to process a respective flow of data in response to said request.

The request may be received from an application.

The request may be configured to cause said one or more components to process a respective flow of data to provide at least a partial offload of data processing required for said application.

The network interface device may comprise at least one interface configured to interface with a host device.

The network interface device may comprise at least one interface configured to interface with a network.

The at least one control message provided by the controller may be configured to cause said plurality of components to define a data pipeline for a respective flow of data.

The at least one control message provided by the controller may be configured to cause one of the creation and configuration of interconnect resources between at least two of said plurality of components to define a data path between at least two of said components of said data pipeline.

The control component may be configured to inject said one or more control packets into said data flow.

The control component may be configured to cause one or more request control messages to be output which are configured to cause one or more components to provide status information in response thereto.

The status information may comprise one or more of status information, performance information and availability information.

The control component may be configured to cause one or more policies to be changed and to apply said one or more changed policy.

The at least one component may be associated with a first level of privilege and said controller is configured to configure said at least one component only if an associated application is entitled make use of a component with that first level of privilege.

The components configured to process said flow of data may define a data path,

The components defining a data path may comprise at least one of: an interface with a host device; a processing engine; and an interface with a network.

The data path may comprise a data processing pipeline.

At least one component may comprises at least one accelerator.

The accelerator may comprise a hardware implemented accelerator.

The at least one accelerator may comprise one or more of a video processing accelerator, a security accelerator, and a protocol processing entity.

The control message may be configured to cause one or more of creation of bus resources, allocation of one or more components to a data path and allocation of one or more interfaces.

The plurality of components may comprise one or more an FPGA, a CPU, a GPU and an IPU.

At least one of said plurality of components may comprise an FPGA and said control message may be configured to reprogram at least a part of said FPGA.

The device may be provided by a plurality of dies, wherein said plurality of components comprise at least one component provided by one die and at least one component provided by another die, said dies being interconnected on a substrate to form at least a part of said device.

The management controller may be provided on one or more of the dies.

One or more control packets may comprise information indicating that said control packet is a control packet.

One or more control packet may comprise information identifying at least one of said plurality of components and a request for the respective component.

Each component identified in said request may be configured, on receiving said control message to respond to said request and to update status information associated with that component in said control message.

Each component identified in said request may be configured, on receiving said control message to respond to said request and when said request is a read request to provide requested data in said control message.

The network interface device may comprise an interface which is configured to receive a program which is compiled and which causes the provision of one or more of: configuration commands for one or more components; and one or more programs to be executed in one or more components.

The configuration commands may be provided by said controller in one or more messages.

The configuration commands may be generated by said controller in response to execution of said compiled program in said controller.

Each of said plurality of components may be configured to update its configuration in response to said one or more control messages such that data received after the control message in said flow is processed by the respective component with its updated configuration.

The at least one control message provided by the controller may be configured to cause said plurality of components to define a data pipeline for a respective flow of data.

The at least one control message provided by the controller may be configured to cause one of the creation and configuration of interconnect resources between at least two of said plurality of components to define a data path between at least two of said components of said data pipeline.

The control component may be configured to cause one or more request control messages to be output which are configured to cause one or more components to provide status information in response thereto.

The status information may be provided in one or more of said control packet and a receive queue for said control component.

The control message may be configured to cause one or more of creation of bus resources, allocation of one or more components to a data path and allocation of one or more interfaces.

The plurality of components may comprise one or more an FPGA, a CPU, a GPU and an IPU.

At least one of said at least one component may comprise a component having a socket configured to receive said control packet and to output said control packet.

The socket may be configured to determine that at least a part of at least one received control packets is the same as a corresponding part of a corresponding output control packet.

The socket may be configured to determine that for a respective control packet that is received by the socket, that the respective control packet is output by the socket.

The socket may be configured to determine that a number of received control packets is the same as a number of output control packets.

The socket may be configured to store at least a part of received control packet and to compare a least a corresponding part of the output control packet to the stored at least a part of the received control packet to determine that a respective control packet is received and output.

The socket may be configured to store a hash of at least a part of the received control packet and to compare a hash of a corresponding part of the output control packet to the stored hash to determine that a respective control packet is received and output.

The socket may be configured to determine a discrepancy between at least a part of one or more received control packets and a corresponding at least a part of one or more output control packet and in response to generate and output an alert.

A socket wrapper of said socket may be configured determine if a respective control packet comprises one or more instructions for said component and if so, to cause one or more of said instructions to be performed.

The socket wrapper may be configured to perform one or more of said one or more instructions for said component.

The socket wrapper may be configured to cause the component to perform one or more of said one or more instructions.

The socket wrapper may be configured to provide one or more messages to a scheduler to cause a rate of packets received by said socket to be one or increased or decreased.

The socket wrapper may be configured determine that a respective control packet is to be output by said external component and to inject the respective control packet into a defined position within a flow of packets output by said socket.

According to another aspect, there is provided a network interface device comprising: a plurality of components configured to process a flow of data one after another; and a control component configured to provide one or more control messages in said flow, said one or more control message being provided to said plurality of components one after another such that a configuration of one or more of said components is changed, wherein said plurality of components in said flow are configured to receive a respective control message and to output said control packet, said control packet being returned to said control component.

Each of said plurality of components may be configured to update its configuration in response to said one or more control messages such that data received after the control message in said flow is processed by the respective component with its updated configuration.

The at least one control message provided by the controller may be configured to cause said plurality of components to define a data pipeline for a respective flow of data.

The at least one control message provided by the controller may be configured to cause one of the creation and configuration of interconnect resources between at least two of said plurality of components to define a data path between at least two of said components of said data pipeline.

The control component may be configured to cause one or more request control messages to be output which are configured to cause one or more components to provide status information in response thereto.

The status information may be provided in one or more of said control packet and a receive queue for said control component.

The control message may be configured to cause one or more of creation of bus resources, allocation of one or more components to a data path and allocation of one or more interfaces.

The plurality of components may comprise one or more an FPGA, a CPU, a GPU and an IPU.

At least one of said at least one component may comprise a component having a socket configured to receive said control packet and to output said control packet.

The socket may be configured to determine that at least a part of at least one received control packets is the same as a corresponding part of a corresponding output control packet.

The socket may be configured to determine that for a respective control packet that is received by the socket, that the respective control packet is output by the socket.

The socket may be configured to determine that a number of received control packets is the same as a number of output control packets.

The socket may be configured to store at least a part of received control packet and to compare a least a corresponding part of the output control packet to the stored at least a part of the received control packet to determine that a respective control packet is received and output.

The socket may be configured to store a hash of at least a part of the received control packet and to compare a hash of a corresponding part of the output control packet to the stored hash to determine that a respective control packet is received and output.

The socket may be configured to determine a discrepancy between at least a part of one or more received control packets and a corresponding at least a part of one or more output control packet and in response to generate and output an alert.

A socket wrapper of said socket may be configured determine if a respective control packet comprises one or more instructions for said component and if so, to cause one or more of said instructions to be performed.

The socket wrapper may be configured to perform one or more of said one or more instructions for said component.

The socket wrapper may be configured to cause the component to perform one or more of said one or more instructions.

The socket wrapper may be configured to provide one or more messages to a scheduler to cause a rate of packets received by said socket to be one or increased or decreased.

The socket wrapper may be configured determine that a respective control packet is to be output by said external component and to inject the respective control packet into a defined position within a flow of packets output by said socket.

According to another aspect, there is provided a network interface device comprising: a plurality of components; a control component configured to provide a control, said control message being provided to said plurality of components one after another such that said plurality of components of are configured to process a flow of data.

According to another aspect, there is provided a method comprising: providing by a control component one or more control messages in a flow of data to a plurality of components, said one or more control message being provided to said plurality of components one after another; and responsive to receiving said one or more control messages, configuring each of said plurality of components based on said one or more control messages.

The configuring may be such that the configuration of each of said plurality of components in response to said one or more control messages is such that data received after the control message in said flow is processed by the respective component with its updated configuration.

The method may comprise receiving by the control component a request and in response thereto to configuring one or more components.

The method may comprise allocating by the control component one or more of said components to process a respective flow of data in response to said request.

The request may be received from an application.

The method may comprising receiving the request at one or more components and in response, the method may comprise processing by said one or more components a respective flow of data to provide at least a partial offload of data processing required for said application.

The network interface device may comprise at least one interface configured to interface with a host device.

The network interface device may comprise at least one interface configured to interface with a network.

The method may comprise, in response to the at least one control message provided by the controller, causing said plurality of components to define a data pipeline for a respective flow of data.

The method may comprise in response to at least one control message provided by the controller, causing one of the creation and configuration of interconnect resources between at least two of said plurality of components to define a data path between at least two of said components of said data pipeline.

The method may comprise injecting by the control component one or more control packets into said data flow.

The method may comprise outputting by the control component one or more request control messages to be output which are configured to cause one or more components to provide status information in response thereto.

The status information may comprise one or more of status information, performance information and availability information.

The method may comprise causing by the control component one or more policies to be changed and to apply said one or more changed policy.

The at least one component may be associated with a first level of privilege and the method comprises configuring by said controller said at least one component only if an associated application is entitled make use of a component with that first level of privilege.

The method may comprise providing a data paths by the components configured to process said flow of data.

The components defining a data path may comprise at least one of: an interface with a host device; a processing engine; and an interface with a network.

The data path may comprise a data processing pipeline.

At least one component may comprises at least one accelerator.

The accelerator may comprise a hardware implemented accelerator.

The at least one accelerator may comprise one or more of a video processing accelerator, a security accelerator, and a protocol processing entity.

The method may comprise causing one or more of creation of bus resources, allocation of one or more components to a data path and allocation of one or more interfaces.

The plurality of components may comprise one or more an FPGA, a CPU, a GPU and an IPU.

At least one of said plurality of components may comprise an FPGA and said control message may be configured to reprogram at least a part of said FPGA.

The device may be provided by a plurality of dies, wherein said plurality of components comprise at least one component provided by one die and at least one component provided by another die, said dies being interconnected on a substrate to form at least a part of said device.

The management controller may be provided on one or more of the dies.

One or more control packets may comprise information indicating that said control packet is a control packet.

One or more control packet may comprise information identifying at least one of said plurality of components and a request for the respective component.

The method may comprise receiving said control message at each component identified in said request, in response to receiving said control message responding to said request and updating status information associated with that component in said control message.

The method comprises receiving said control message at each component identified in said request, responding to said request and when said request is a read request providing requested data in said control message.

The network interface device may comprise an interface and the method comprise receiving at the interface a program which is compiled and which causes the provision of one or more of: configuration commands for one or more components; and executing one or more programs in one or more components.

The method may comprise providing configuration commands by said controller in one or more messages.

The method may comprise generating the configuration commands by said controller in response to executing said compiled program in said controller.

The method may comprise comprising, updating, by each of said plurality of components, the configuration in response to said one or more control messages such that data received after the control message in said flow is processed by the respective component with its updated configuration.

The at least one control message provided by the controller may cause said plurality of components to define a data pipeline for a respective flow of data.

The at least one control message provided by the controller may cause one of the creation and configuration of interconnect resources between at least two of said plurality of components to define a data path between at least two of said components of said data pipeline.

The method may comprise causing, by the control component, one or more request control messages to be output which are configured to cause one or more components to provide status information in response thereto.

The status information may be provided in one or more of said control packet and a receive queue for said control component.

The control message may cause one or more of creation of bus resources, allocation of one or more components to a data path and allocation of one or more interfaces.

The plurality of components may comprise one or more an FPGA, a CPU, a GPU and an IPU.

At least one of said at least one component may comprise a component having a socket, the socket receiving said control packet and outputting said control packet.

The method may comprise determining, by said socket, that at least a part of at least one received control packets is the same as a corresponding part of a corresponding output control packet.

The method may comprise determining, by said socket, that for a respective control packet that is received by the socket, that the respective control packet is output by the socket.

The method may comprise determining, by said socket, that a number of received control packets is the same as a number of output control packets.

The method may comprise storing, by said socket, at least a part of the received control packet and comparing a least a corresponding part of the output control packet to the stored at least a part of the received control packet to determine that a respective control packet is received and output.

The method may comprise storing, by said socket, a hash of at least a part of the received control packet and comparing a hash of a corresponding part of the output control packet to the stored hash to determine that a respective control packet is received and output.

The method may comprise determining, by said socket, a discrepancy between at least a part of one or more received control packets and a corresponding at least a part of one or more output control packet, and in response, generating and outputting an alert.

The method may comprise determining, by a socket wrapper of said socket, if a respective control packet comprises one or more instructions for said component and if so, causing one or more of said instructions to be performed.

The method may comprise performing, by said socket wrapper, one or more of said one or more instructions for said component.

The method may comprise causing, by said socket wrapper, the component to perform one or more of said one or more instructions.

The method may comprise providing, by said socket wrapper, one or more messages to a scheduler to cause a rate of packets received by said socket to be one or increased or decreased.

The method may comprise determining, by said socket wrapper, that a respective control packet is to be output by said external component and injecting the respective control packet into a defined position within a flow of packets output by said socket.

According to another aspect, there is provided a network interface device comprising: providing a plurality of components configured to process a flow of data one after another; providing by a control component one or more control messages in said flow, said one or more control message being provided to said plurality of components one after another such that a configuration of one or more of said components is changed; and receiving, by said plurality of components in said flow, a respective control message and outputting said control packet, said control packet being returned to said control component.

The method may comprise comprising, updating, by each of said plurality of components, the configuration in response to said one or more control messages such that data received after the control message in said flow is processed by the respective component with its updated configuration.

The at least one control message provided by the controller may cause said plurality of components to define a data pipeline for a respective flow of data.

The at least one control message provided by the controller may cause one of the creation and configuration of interconnect resources between at least two of said plurality of components to define a data path between at least two of said components of said data pipeline.

The method may comprise causing, by the control component, one or more request control messages to be output which are configured to cause one or more components to provide status information in response thereto.

The status information may be provided in one or more of said control packet and a receive queue for said control component.

The control message may cause one or more of creation of bus resources, allocation of one or more components to a data path and allocation of one or more interfaces.

The plurality of components may comprise one or more an FPGA, a CPU, a GPU and an IPU.

At least one of said at least one component may comprise a component having a socket, the socket receiving said control packet and outputting said control packet.

The method may comprise determining, by said socket, that at least a part of at least one received control packets is the same as a corresponding part of a corresponding output control packet.

The method may comprise determining, by said socket, that for a respective control packet that is received by the socket, that the respective control packet is output by the socket.

The method may comprise determining, by said socket, that a number of received control packets is the same as a number of output control packets.

The method may comprise storing, by said socket, at least a part of the received control packet and comparing a least a corresponding part of the output control packet to the stored at least a part of the received control packet to determine that a respective control packet is received and output.

The method may comprise storing, by said socket, a hash of at least a part of the received control packet and comparing a hash of a corresponding part of the output control packet to the stored hash to determine that a respective control packet is received and output.

The method may comprise determining, by said socket, a discrepancy between at least a part of one or more received control packets and a corresponding at least a part of one or more output control packet, and in response, generating and outputting an alert.

The method may comprise determining, by a socket wrapper of said socket, if a respective control packet comprises one or more instructions for said component and if so, causing one or more of said instructions to be performed.

The method may comprise performing, by said socket wrapper, one or more of said one or more instructions for said component.

The method may comprise causing, by said socket wrapper, the component to perform one or more of said one or more instructions.

The method may comprise providing, by said socket wrapper, one or more messages to a scheduler to cause a rate of packets received by said socket to be one or increased or decreased.

The method may comprise determining, by said socket wrapper, that a respective control packet is to be output by said external component and injecting the respective control packet into a defined position within a flow of packets output by said socket.

A computer program comprising program code means adapted to perform the herein described methods may also be provided. In accordance with further embodiments apparatus and/or computer program product that can be embodied on a computer readable medium for providing at least one of the above methods is provided.

In the above, many different embodiments have been described. It should be appreciated that further embodiments may be provided by the combination of any two or more of the embodiments described above.

Various other aspects and further embodiments are also described in the following detailed description of examples embodying the invention and in the attached claims.

BRIEF DESCRIPTION OF FIGURES

Some embodiments will now be described by way of example only with reference to the accompanying Figures in which.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

When data is to be transferred between two data processing systems over a data channel, such as a network, each of the data processing systems has a suitable network interface to allow it to communicate across the channel. Often the network is based on Ethernet technology. It should be appreciated that other networks may use other technology.

Data processing systems that are to communicate over a network are equipped with network interfaces that are capable of supporting the physical and logical requirements of the network protocol. The physical hardware component of network interfaces are sometimes referred to as network interface devices or network interface cards (NICs) or network adapters.

Computer systems generally include an operating system (OS) through which user level applications communicate with the network. A portion of the operating system, known as the kernel may comprise protocol stacks for translating commands and data between the applications and a device driver specific to the network interface devices. By providing these functions in the operating system kernel, the complexities of and differences among network interface devices may be hidden from the user level application. The network hardware and other system resources (such as memory) can be safely shared by many applications and the system can be secured against faulty or malicious applications.

Figure 1:
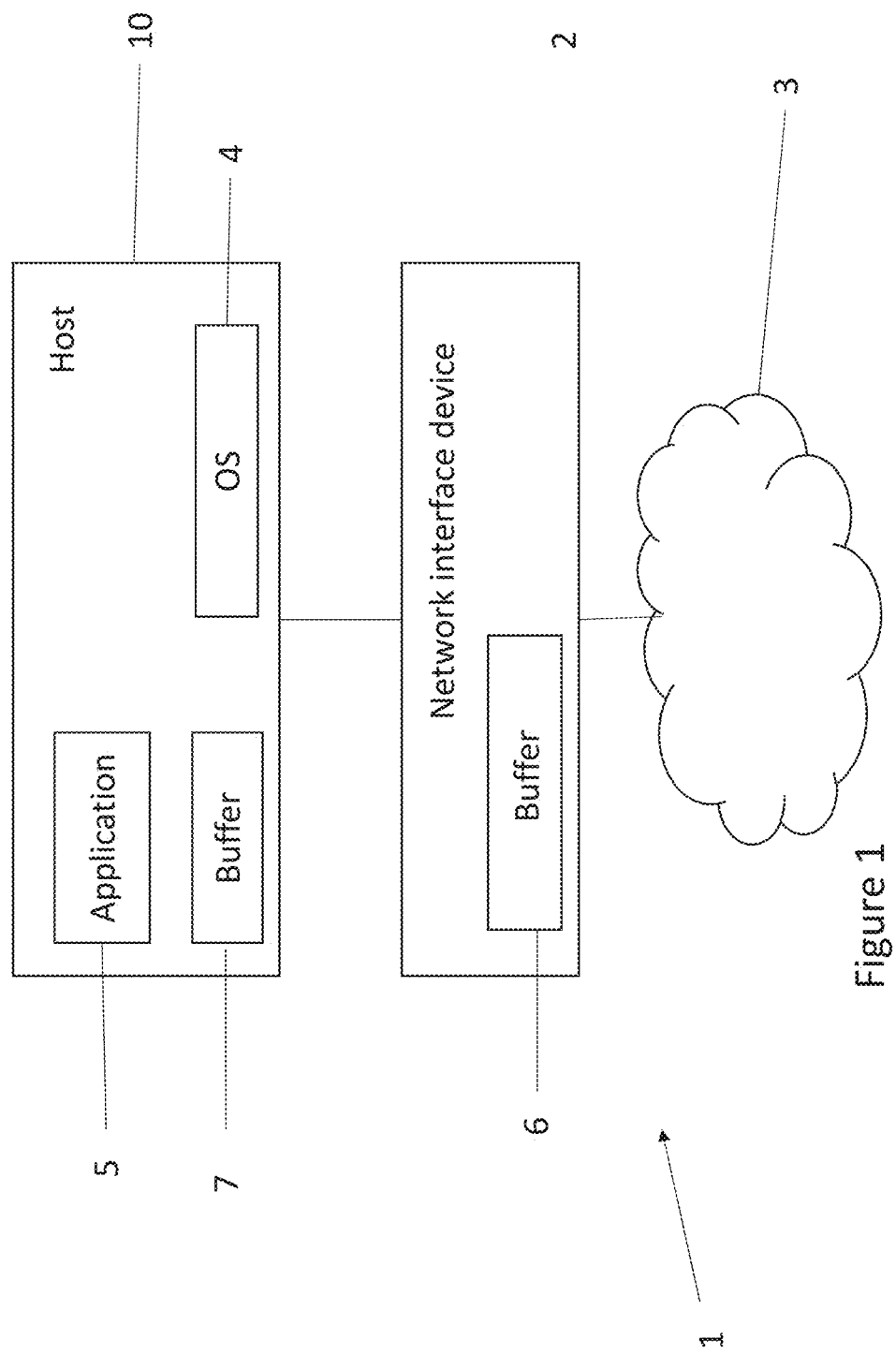
FIG. 1 shows a schematic view of a network interface device and host device.

An example data processing system 1 for carrying out communications across a network is shown in FIG. 1. The data processing system 1 comprises a host computing device 10 coupled to a network interface device 2 that is arranged to interface the host to network 3. The host computing device 10 has an operating system 4 supporting one or more user level applications 5.

The host computing device 10 may also include a network protocol stack (not shown). For example, the protocol stack may be a component of the application, a library with which the application is linked, or be provided by the operating system. In some embodiments, more than one protocol stack may be provided. The network protocol stack may be a Transmission Control Protocol (TCP) stack or any other suitable stack depending on the transport protocol which is being supported.

The application 5 can send and receive TCP/IP messages by opening a socket and reading and writing data to and from the socket, and the operating system 4 causes the messages to be transported across the network. For example, the application can invoke a system call (syscall) for transmission of data through the socket and then via the operating system 4 to the network 3. This interface for transmitting messages may be known as the message passing interface.

Instead of implementing the stack in the host 10, some systems offload at least a part of the protocol stack to the network interface device 102. In some embodiments, at least a part of the protocol stack may be provided at the user level.

For example, in the case that the stack is a TCP stack, the network interface device 2 may comprise a TCP Offload Engine (TOE) for performing the TCP protocol processing. By performing the protocol processing in the network interface device 2 instead of in the host computing device 10, the demand on the host system's 10 processor/s may be reduced. Data to be transmitted over the network, may be sent by an application 5 via a TOE-enabled virtual interface driver, by-passing the kernel TCP/IP stack entirely. Data sent along this fast path therefore need only be formatted to meet the requirements of the TOE driver.

The host computing device 10 may comprise one or more processors and one or more memories. In some embodiments, the host computing device 10 and the network interface device 2 may communicate via a bus, for example a peripheral component interconnect express (PCIe bus).

During operation of the data processing system, data to be transmitted onto the network may be transferred from the host computing device 10 to the network interface device 2 for transmission. In one example, data packets may be transferred from the host to the network interface device directly by the host processor. The host may provide data to one or more buffers 6 located on the network interface device 2. The network interface device 2 may then prepare the data packets and transmit them over the network 3.

Alternatively, the data may be written to a buffer 7 in the host system 10. The data may then be retrieved from the buffer 7 by the network interface device and transmitted over the network 3.

In both of these cases, data is temporarily stored in one or more buffers prior to transmission over the network.

During operation of the data processing system, data may be received from the network. The data may be directed to the host computing device 10.

Some network interface devices are becoming more complex and capable of providing a wide range of functions.

Some embodiments may support the transmission of data over a network from a data processing system and/or the receipt of data from the network. A data processing system could be any kind of computing device, such as a server, personal computer or handheld device. Some embodiments may be suitable for use in networks that operate TCP/IP over Ethernet. In other embodiments one or more different protocols may be used. Embodiments may be used with any suitable networks, wired or wireless.

In some embodiments, the network interface device functionality may be at least partially provided by a field programmable gate array FPGA and/or one or more processing units such as a CPU, IPU or GPU. One or more of these may support one or more applications. One or more of these may be configured after the network interface device has been deployed and/or before the network interface device has been deployed.

For example an FPGA may be implemented using an integrated circuit designed to be configured by a customer or designer after its manufacture. FPGAs may offer the ability to deploy a circuit which provides an application specific solution. An FPGA can allow for customization of a network interface device. Such applications may be niche or small volume applications. The FPGA is an array of programmable logic blocks. An FPGA may be characterised as being reprogrammable at the logic element granularity. An FPGA may be regarded as being an array of gates.

The data may be a data packet having a payload and header according to a suitable network protocol.

Figure 2:
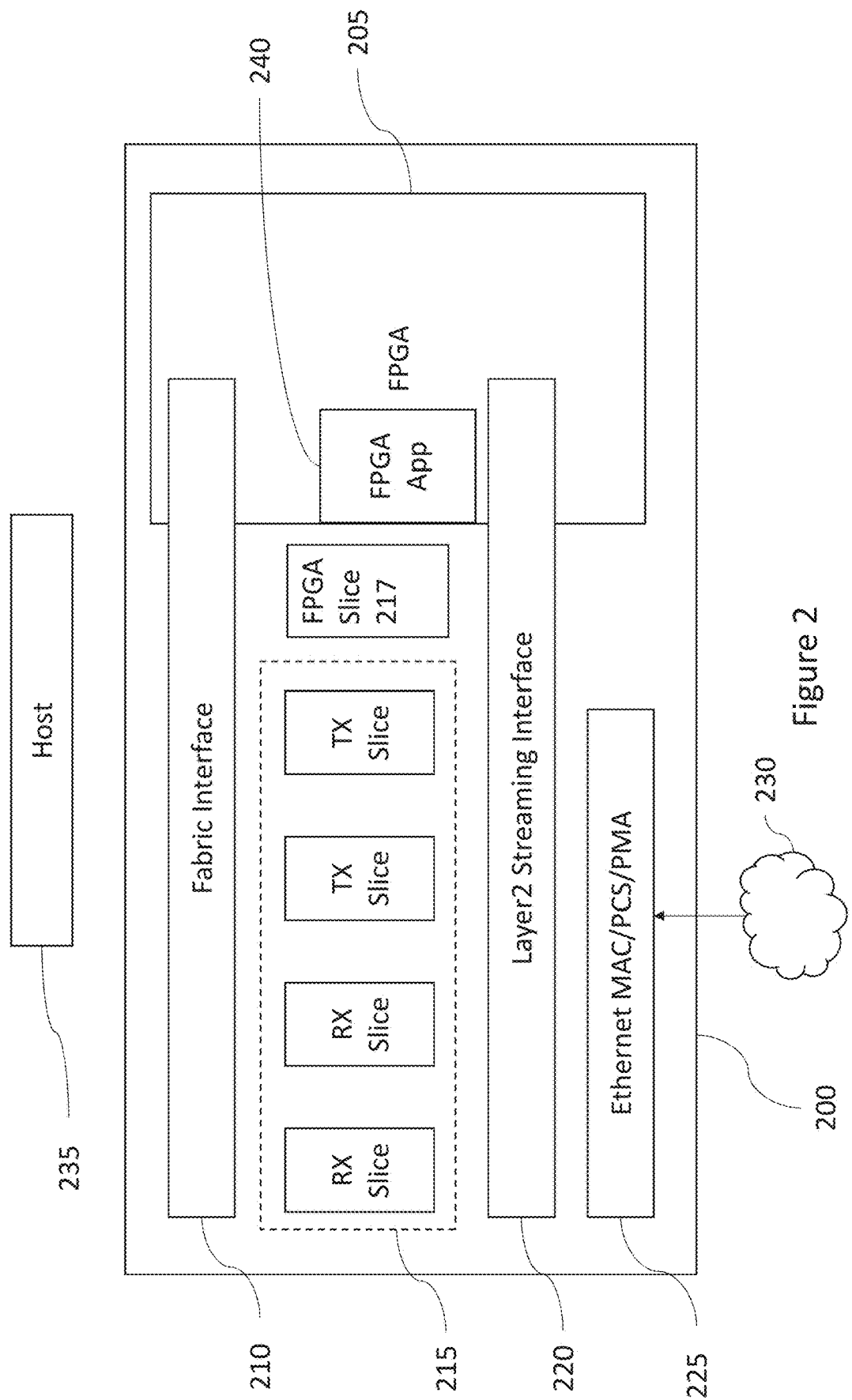
FIG. 2 schematically shows a more detailed schematic view of a network interface device.

Reference is made to FIG. 2, which shows one example of a network interface device in more detail.

The network interface device functionality may be embedded in a FPGA 205 in some embodiments. That FPGA 205 may have network interface functionality and FPGA functionality. The FPGA functionality may provide an FPGA application 240, which may be programmed into the FPGA 205 according to the needs of the network interface device user. In some embodiments, regions of the FPGA 205 may support applications.

In some embodiments, one or more FPGA slices 217 may be provided. The FPGA slices may be provided by the FPGA 205. The one or more FPGA slices may be regarded as a processing engine. One or more slices may be allocated inside the FPGA as required.

In some embodiments, a data path or data slice may have a part provided by the FPGA and a part provided by one or more of an accelerator and another processor.

The FPGA application 240 may, for example, provide filtering of the messages on the receive path from the network 230 to the host. The FPGA application 240 may provide a firewall. The FPGA application 240 may be used for any suitable purpose. For example, the FPGA application 240 may reduce data in one or more flows. For example, the FPGA application 240 may remove duplicate messages in an arbitration application. The FPGA application 240 may alternatively or additionally be used to aggregate data. For example the FPGA may buffer and consolidate network captures for more efficient host delivery. Alternatively or additionally, the FPGA may be used for hybrid processing. For example the FPGA may provide a toolkit to enable hybrid applications to implement fast-path processing (low-latency) on the FPGA while using a slice to handle slower (and more complex TCP) protocol activity. This is also known as Delegated-Send on the transmit side. The FPGA may be used to detect frames which are part of DDOS (distributed denial of service) attack. Those frames may be dropped or filtered. The FPGA may alternatively or additionally be used for machine learning with a neural network or the like.

The FPGA may be programmable to provide the FPGA application 240 using a high level programming language, such as C-based languages. The high level programming of the FPGA may be achieved using high level synthesis. The FPGA application 240 may implement a neural network and perform feature extraction or classification based on incoming frames.

In some embodiments, the network interface device functionality may be implemented as "hard" logic within the FPGA. For example, the hard logic may be application specific integrated circuit (ASIC) gates. In other embodiments, the network interface functionality may alternatively or additionally be implemented by "soft" logic. The FPGA application 240 may be implemented as "soft" logic. The soft logic may be provided by programming the FPGA LUTs (look up tables). The hard logic may be capable of being clocked at a higher rate as compared to the soft logic.

The network interface device 200 has a first interface 210 configured to receive data from the host 230. The first interface 210 may be a Fabric interface. The first interface 210 interfaces the transport engine 215 with the host computing device 235. The first interface 210 also interfaces the FPGA application 240 with the host 235. The first interface may provide an application programming interface, allowing the host 235 to perform memory read and writes to memory associated with the FPGA application 240.

Some drivers may be associated with the memory interfaces. This allows host applications to directly access the FPGA application 240 from the host and make use of the functions of the FPGA application 240 at the same time that the FPGA is used as a network interface device. The memory based interface may be mapped through a different PCI function than is used by the message passing interfaces. The message passing interfaces typically have one function per Ethernet port. The host software may attach a driver to each function and may attach the network stack to the interface to the network.

The network interface device 200 further comprises a transport engine 215, configured to process the data packets in accordance with a transport protocol, such as TCP/IP. The transport engine 215 may comprise a protocol stack. The transport engine 215 may comprise a plurality of slices or data pipeline, some of the slices being RX slices configured to perform receive processing of the ingress data packets received from the network 230, and some of the slices being TX slices configured to perform transmit processing of the egress data packets to be transmitted onto the network 230. In some embodiments, a slice may be able to handle both data to be transmitted and received data.

In the example shown, four slices are provided. However, it should be appreciated that in other embodiments, a different number of slices are used. In one embodiment, a slice may be arranged to process received data or to process data to be transmitted. In other embodiments, a slice may be arranged such that it is able to process received data and data to be transmitted. In some embodiments, the number of slices may be the same as the number of ports. In some embodiments, there may be a transmit slice and a receive slice for each port. In some embodiments, there may not be a direct correlation between the number of ports and the number of slices. In some embodiments, a slice can be switched dynamically from processing received data to processing transmitted data and vice versa.

Each slice may be regarded as a processing engine. Each slice may thus execute micro code to implement functions such as parsing, matching offload and delivery semantics for the data path. The slice may act on any bit of a frame.

The slices may perform a parsing action on the data which the slice is processing. There may be a matching action which matches the data against for example a filter and action function which performs an action or not in dependence on the result of the matching.

The network interface device 200 also comprises a second interface 220 configured to interface the transport engine 215 with the network 230 and configured to interface the FPGA application 240 with the network 230. The second interface may be a layer 2 streaming interface. The second interface may provide an interface to the network 230 via a third interface 225. The third interface 225 may receive data packets from the second interface and cause them to be transmitted over the network 230. The third interface 225 may similarly receive data packets from the network 230 and pass them to the second interface 220. The third interface 225 may comprise a MAC interface. The third interface 225 may comprise a plurality of MAC interfaces. The third interface 225 may comprise one or more physical coding sublayer (PCS) interfaces. The third interface 225 may comprise one or more physical medium attachment (PMA) interfaces.

The fabric interface is configured to allow the co-resident FPGA application 240 to receive frames from the host. The FPGA application 240 may be able to transmit frames to the data path processing at the same bandwidth as the host PCI.

The layer 2 streaming interface is configure to allow the FPGA application 240 to receive frames form any active MAC layer interface and to transmit frames to a data path associated with that MAC.

The network interface device may provide functionality such as flow steering and low latency operation, hardware timestamping and clock synchronisation.

The third interface 225 is configured to receive the data packets from the network and pass them to the second interface 220. The second interface 220 is configured to pass the data packets to the transport engine 215, which performs protocol processing of the data packets, prior to passing the processed data packets to the fabric interface 210. The fabric interface 210 is configured to pass some of the data packets to the host 235, and some of the data packets to the FPGA application 240. The fabric interface may determine to pass data packets of a first flow to the host 235 and data packets of a second flow to the FPGA 205. The data packets received at the FPGA application 240 are processed by the FPGA application 240, before being passed to the host 235. Hence, the FPGA 205 can provide accelerator functions for some data packets prior to them being received at the host 235.

As explained, the FPGA 205 may provide a plurality of FPGA applications. The FPGA 205 could provide a first application and a second application. The data may be directed from a first interface 210 to the first field programmable gate array application 240 for processing. Additionally, however, the first and second interface may be configured to direct data to a second field programmable gate array for processing.

In some embodiments, the second interface 220 is configured to receive the data packets from the network and provide the data packets to a second FPGA application for processing. The second application may process the data by performing DDOS mitigation, such as searching the data packets for a DDOS attack and taking remedial action against a DDOS attack. The data packets may comprise updates to a data store, maintained by the first FPGA application. The second FPGA application may be configured to provide security by searching the data packets to detect any threats posed by the data packets and taking any action as required.

After processing by the second FPGA application, the second FPGA application is configured to provide the data packets to the transport engine 215 for protocol processing. Once the data packets have been processed, they are passed to a first interface, which is configured to provide the data packets to the first FPGA application.

The first FPGA application is configured to process the data packets. The processing by the first FPGA application may comprise updating the data store maintained by the first FPGA application with the data contained in the data packets.

The host may also provide queries of the data in the data store maintained by the first FPGA application. In response to a query, the first FPGA application may be configured to provide the requested data from the data store to the host 235.

For data which is to be transmitted, the first interface 210 may be configured to receive data from the host 235 and to direct some of the data to the transport engine 215 for processing without it first being processed by the FPGA application 240. The first interface 210 is also configured to transfer some data to the FPGA application 240 for processing by the FPGA application 240. Once the data has been processed by the FPGA application 240, the FPGA application 240 may be configured to transfer those data packets to the first interface, which is configured to pass them to the transport engine 215 for protocol processing. The transport engine 215 is configured to process the data it receives to produce protocol processed data packets prior to them being transmitted onto the network. The protocol processed data packets may be passed to the second interface 220 and subsequently the third interface 225 prior to their transmission onto the network 230.

In some embodiments, a host application may communicate directly with the FPGA application 240 via memory mapping. The host application may write to a shared memory on the host 235, which is memory mapped to a memory accessible to the FPGA application 240. Hence, the FPGA application 240 may receive data written to the shared memory by the host 235. Likewise, the FPGA application 240 may write to the memory that is accessible to it, with that data being automatically copied from that memory to the memory of the host 235 so that it received by the host application 235.

In some cases, some data may be transferred to the transport engine 215 from the host 235 and some data may be transferred to the FPGA application 240 from the host 235 in parallel. For example, a first host application may transfer data to the transport engine 215 via the first interface, whilst a second host application is transferring data to the FPGA application 240 at the same time.

Figure 3:
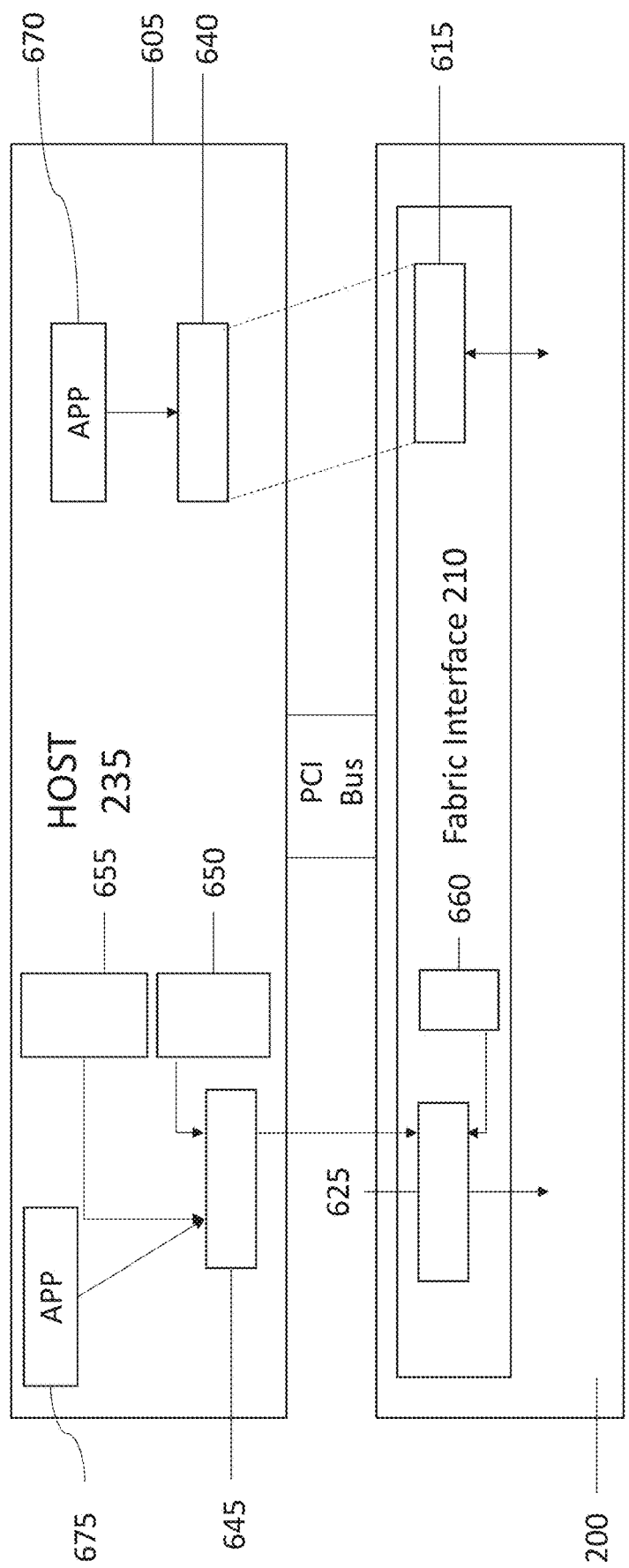
FIG. 3 schematically illustrates examples of data transfer mechanisms between a network interface device and host device.

Reference is made to FIG. 3, which illustrates how data may be transferred from the host 235 to the network interface device 200. To assist this some components of the host are shown and some components of the fabric interface 210 are show. (For clarity other of the components of the network interface device are not shown in FIG. 3). As explained previously, the first interface 210 is configured to receive data from the host 235. The host 235 may make the determination as to which of these is to apply to particular data. The host 235 may transfer data using different methods to memory associated with the first interface 210. For example, the host 235 may memory map data to a first memory 615 of the first interface 210. The first interface 210 is configured to provide the data in the first memory 615 to the FPGA application.

Alternatively, the host 235 may transfer data to a second memory 625 of the first interface 210. The first interface 210 may be configured to provide the data in the second memory 625 to a transport engine (provided by a TX slice for example) for processing. The first memory 615 and the second memory 625 may each comprise one or more buffers. This option may be used by an application which may naturally suit or may have been originally written to use a message passing communication paradigm rather than memory mapped. Some applications may have been written with a network communication in mind and may be using standard network protocols and the socket ( ) API to communicate.

The host may comprise a memory 640, which is memory mapped to the memory 615 on the network interface device 200 or vice versa. The memory mapping may be such that a user level process/host application 670, which is configured to write to the memory 640, and the network interface device 200 both have access to shared memory to which data is written.

The communication between the FPGA application and the host is bidirectional, i.e. the FPGA application can also transfer data to the host 235 as well as receive data from the host 235. To transfer data to the host 235, the FPGA application is configured to write data to the shared memory so that a user level process 670 running on the host may access the data.

The host 235 comprises a memory 645 at which data may be stored for transfer to the memory 625 of the network interface device 200. The data may be provided to the memory 625 from a second application 675 running on the host 235. Hence, the second application 675 may transfer data using this socket interface to the network interface device 200. The data in memory 625 is provided to the transport engine. The host 235 also comprises a transmit queue 650 comprising a series of pointers pointing to locations in the memory 645 from which data is to be transferred to the network interface device 200. The host may comprise a queue 655 identifying the next available location in the memory at which data is to be written by the application 675. The queues 650 and 655 may comprise FIFO buffers. The data may be stored in the buffer 645 at the next available location—as identified by the next pointer in the queue 655—by a user level process 675. A processor of the host device is configured to read the next pointer from the transmit queue 650 and read the data from the buffer 645 at the location identified by the pointer and transfer the data to the network interface device 200. The network interface device 200 is configured to store the data in memory 625 at a location identified by the next pointer in the receive queue 660. The data in memory 625 may then be provided to the transport engine for protocol processing.

It should be appreciated that in some embodiments, the host may be provided by an embedded system with CPUs connected to the network interface device via a bus PCI or AXI (advanced extensible interface) where the CPUs are within the same ASIC (application specific integrated circuit) SOC (system on chip) device as the network interface device.

The communication between the transport engine and the host 235 is also bidirectional. A similar memory transfer mechanism may be implemented for transfer of the data from the fabric interface to the host 235.

Some of the data path components of the network interface device may be configured at runtime. These components comprise one or more of: data path slices, which implement functions such as switching, steering, (de)encapsulation etc.; and accelerators which may perform a variety of functions such as host offloads, gateways, security and other applications.

In previously proposed network interface devices, the control plane may be managed by a management CPU (MC) which configures the data paths by writing registers, or passing messages to the data path components. The control plane is carried by one or more control buses that are separate from the data path.

In some embodiments, the different data path slices such as previously discussed may have different configuration requirements. The configuration of the data paths may change over time. Some embodiments may provide a mechanism to forward configuration to such components from the configuring agent or component.

In some embodiments, a network interface device may be structured such that a number of FPGA slices are present. It may be that there are a two or more FPGA applications sharing the network interface device. The different applications may be on the same slice and/or different slices.

In some situations an entire FPGA slice may be allocated as a unit, memory mapped to the host and bound to a single high-level application instance using a framework such as OpenCL. This is convenient, but may be wasteful of resources if a number of applications require smaller amounts of FPGA than is provisioned by the slices. It is possible to independently re-program areas of FPGA both within a single slice and entire slices.

The network processing functions may be bound to the physical Ethernet ports and at least some degree of processing to be active so long as a device is active. The network flows which are handled by the network processing functions need to be passed onto the appropriate FPGA applications for which they are instantiated. This instantiation may be dynamic. For example logic regions may be programmed and re-programmed. Network flows may be required to be parsed, identified and routed through chains of such FPGA applications and optionally mingled with hard-ASIC accelerator blocks.

Figure 4:
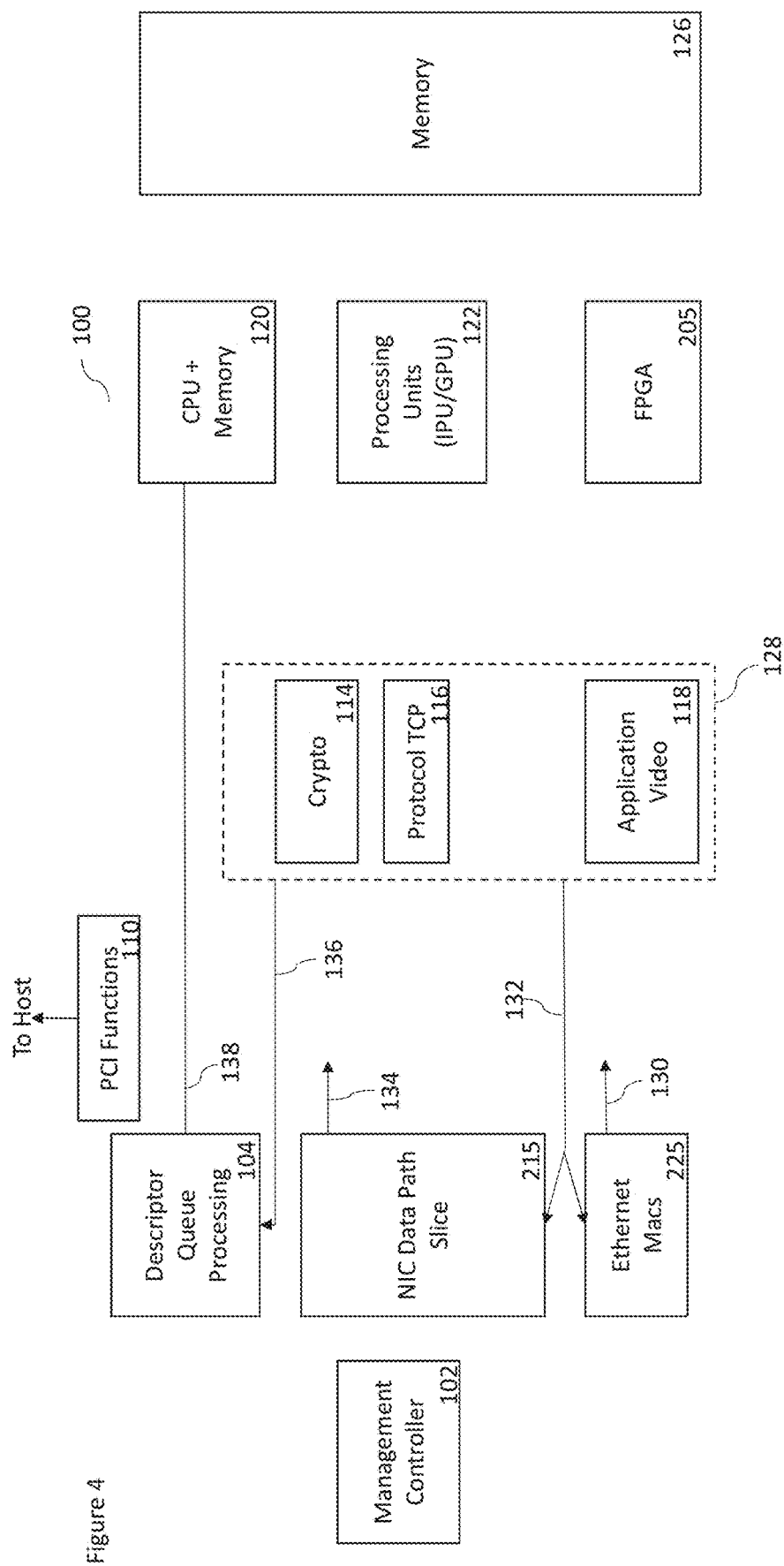
FIG. 4 schematically shows components of a network interface device.

Reference is made to FIG. 4 which schematically shows a network interface device. Those blocks which are the same as shown in FIGS. 2 and 3 are referenced by the same reference number. It should be appreciated that the arrangement of FIG. 4 may be incorporated in a network device such as shown in FIGS. 2 and 3. In that scenario, the network interface device may be comprise the additional components shown in FIG. 4. In other embodiments, the arrangement of FIG. 4 may be provided in a different network interface device. It should be noted that the functions shown in FIG. 4 are by way of example only and different embodiments have different functions in addition and/or in the alternative.

A management controller MC 102 is provided which is configured to control the configuration of the different functions of the network interface device, as will be described in more detail.

A MAC interface 225 such as previously described is provided as is a data slice 215. In practice there may be more than one slice. One or more dedicated accelerators 128 or other components may be provided. The components may comprise one or more of: a cryptographic component 114 for one or more of encryption and decryption; a protocol processing engine 116, for example a TOE; a video processing component 118; and/or the like.

One or more of the components in a data path may be programmed using a high level language such as C or P4. Thus in some embodiments, the data-path itself can be constructed using a high level language rather than a pre-existing data-path being only programmed. In some embodiments a high-level program can decide that it needs a network interface device to be constructed with particular properties. These properties may comprise one or more of network interface type, network interface speed, host interface (e.g. PCI) type, host interface speed, connected to a particular CPU data-path. The particular data path may run a particular P4 program chain of offloads and/or use particular hardware accelerators. The particular data path may interface to the host using OpenOnload (a Solarflare network stack) or interface to a particular OpenCL (open computing language) program, This may be dynamically provisioned and composed in for example a data-centre. In some embodiments, the network interface device and its accelerator hardware may be constructed on the fly in a manner which is customisable for the application.

Figure 10:
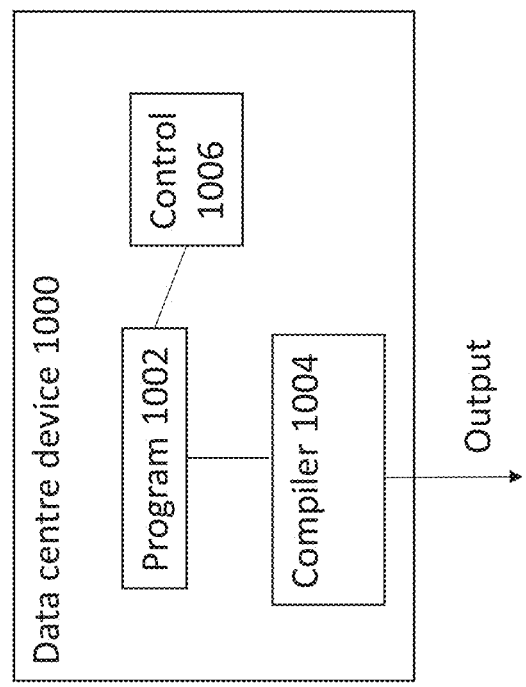
FIG. 10 shows a data center device.

Reference is made to FIG. 10 which schematically shows a data center device 1000 provided in a data centre. The device comprises a program function 1002 which is configured to provide a high level program which is used to construct a data path in the network interface device. The program function may be controlled by a control function 1006 to provide the required high level program. The device comprises a compiler 1004 which is configured to provide a compiled output of the high level program. This compiled output is provided to the network interface device. This may be provided via the network or other connection. The functions shown in FIG. 10 may be provided in a single device or across a plurality of devices. One or more of the functions may be provided by hardware which is suitably programmed by computer code to cause the hardware to provide the required function. Common hardware may be shared by one or more of the functions. Alternatively or additionally separate hardware may be provided for one or more functions. The hardware may comprise any suitable hardware such as a processor. The data center device may be a server or the like.

The compiled output is used by the management controller to produce configuration command for one or more components. Alternatively or additionally the compiled output is used by the management controller to provide programs for execution in a component. Alternatively or additionally the compiled output is used by the management controller provide a logic specification (which itself is compiled) for new custom hardware components.

For some types of components, such as a CPU, the management controller ensures that the CPU is properly connected at the interface level. In some embodiments, the management controller delivers the compiled code which runs on the CPU. In some embodiments, the MC would define an interface through which the compiled code is delivered Thus the high level language program, which is compiled is used to specify the structure of the network interface device. The process of compiling provides commands to assemble the network components and/or commands to program the components. The commands may be propagated to the required components by the management controller.

In some embodiments the compiler may instead be an interpreter or any other form of function which translates the high level language into lower level commands, programs or logic descriptions.

The network interface device is provided with a PCI function 110, as shown in FIG. 4, for enabling communication with the host.

The network interface device comprises a descriptor queue processing function 104 which will be described in more detail later.

The network interface device may be provided with processing capability in the form of one or more of: one or more FPGA 205; one or more processing units such as an IPU or GPU; and one or more CPU. One or more of these processors may provide one of more of the components previously described. Alternatively or additionally one or more other processors or other suitable hardware may be configured to provide one or more of the components.

In some embodiments one or more of the processor may be configured to provide one or more accelerating or processing functions. In some embodiments, the CPU may provide a virtual NIC VNIC function.

Memory is also available to the network interface device. This is referenced 126. The memory may be a previously described. The memory may be memory in the network interface device and/or may be in the host device. There may be an on-chip private or dedicated bus between the memory and the memory controller, in some embodiments.

In some embodiments, the control plane or configuration information is carried over the data path, rather than requiring separate control buses. In some embodiments, requests to update the configuration of data path components are encoded as messages which are carried over the same buses as network packets. Thus the data path may carry two types of packets: network packets and control packets.

Control packets are formed by the MC, and injected into the data path using the same mechanism that the MC uses to send network packets. This same mechanism may be a transmit queue. Control packets may be distinguished from network packets in any suitable way. In some embodiments, the different types of packets may be distinguished by a bit or bits in a metadata word.

In some embodiments, the MC is considered to "own" the resources. As such the management controller is configure to control the allocation of the resources.

In some embodiments, the MACs and transmission queues may not set the control bit and so cannot inject control packets. However in other embodiments, the MACs and transmission queues may set the control bit or bits and thus be able to inject control packets.

In some embodiments, the control packets contain a routing field in the metadata word that determines the path that the control packet takes through the data path. A control packet may carry a sequence of control commands. Each control command may targets one or more data path component. The respective data path component is identified by a component ID field. Each control command encodes a request for the respective identified component. The request may be to make changes to the configuration of that component and/or to read configuration state or other data.

Read commands include a payload area, which the data path component overwrites with the requested data. This data can be used by a subsequent component, for example in the data path and/or be used by the configuring entity.

Each control command may have a status field. This may be initialised, for example to zero. When the command is executed by a data path component the status is updated to indicate success or an error.

In some embodiments, control buses may not be required. This may free routing resource, make it simpler to meet timing requirements and/or simpler to implement.

As discussed previously, some embodiments may provide a set of data path components interconnected by streaming buses. These buses carry network packets and control packets. These control packets encapsulate control plane messages.

A control packet may not be generated by the host. Rather the control packet may be generated on the network interface device. A control packet may not be received from a network. A control packet may be generated and consumed in the network interface device.

A control packet may be at least partially or completely immutable. A control packet may for example configure one or more components on a data path as the control packet is passed through the data path. The packet may be unchanged as it passed through the data path. It should be appreciated that in some embodiments, the control packet may be collecting or reading data (as discussed in more detail later) which is added to the payload of the control packet. In that scenario, the control packet may be unchanged other than for the addition of the collected data.

Control packets may be generated by the MC, routed through a data path and returned to the MC. In some embodiments, control packets may be generated by one or more other hardware components on the network interface device. The hardware component may be deployed such that control packets may be issued and received relatively quickly by the respective component. This may be to facilitate the use of a plug in component which may need to rapidly be deployed or reconfigured. For example, the behaviour of a component may need to be changed relatively quickly compared to a frame rate. By way of example only, this may facilitate the change of security keys in an authentication procedure. For example a control packet may comprise an updated key or a location of a next key to be use or prompt the use of a next key.

Figure 11:
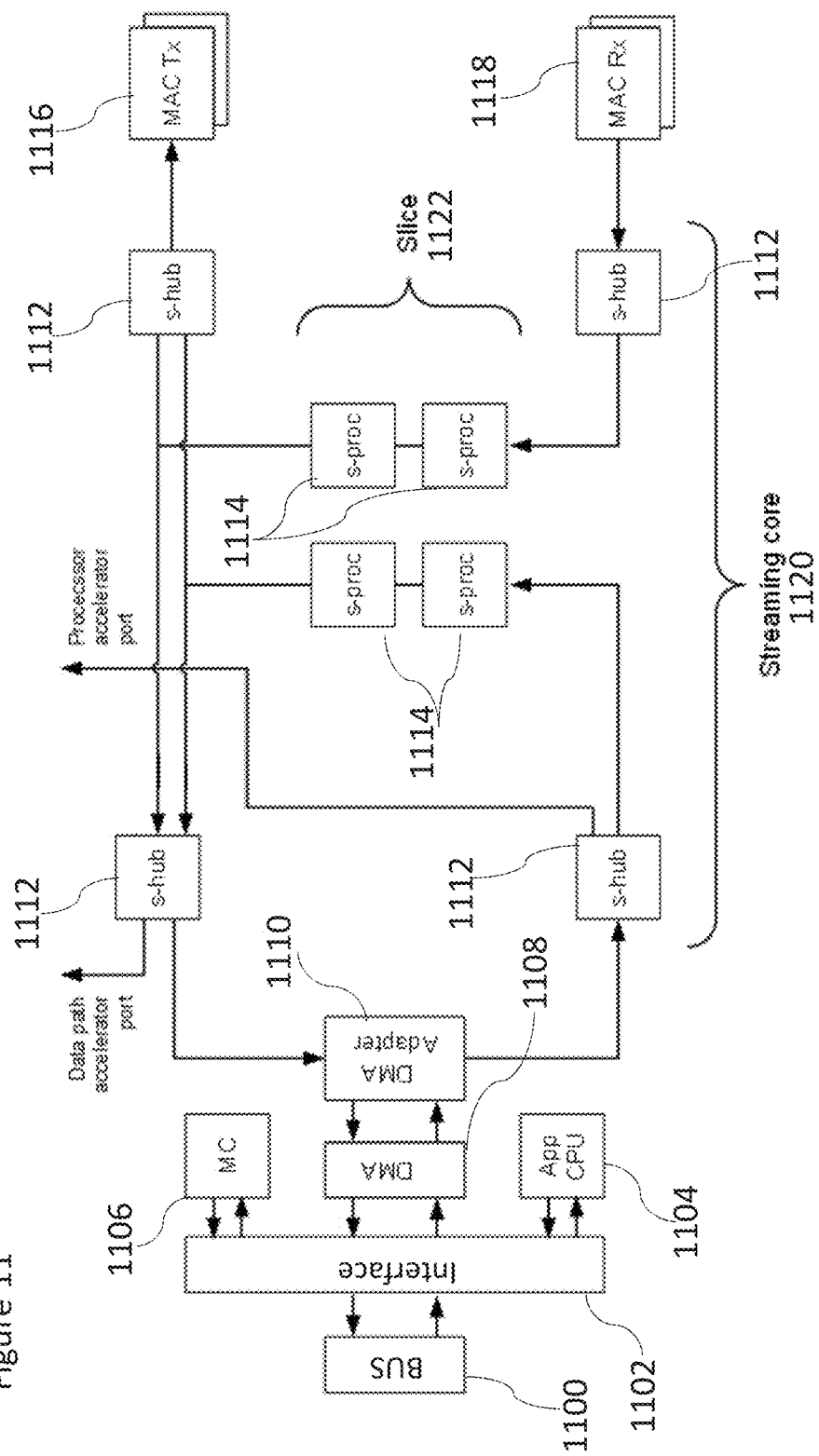
FIG. 11 schematically shows a network interface device.

Reference is made to FIG. 11 which shows a schematic representation of a network interface device. The network interface device may be implemented such as previously described or in a different manner. In the context of the example embodiment of FIG. 2 for example, the data path components of FIG. 11 may be provided within the dotted block referenced 215.

The data path components of FIG. 11 may comprise one or more of:

One or more streaming processors 1114. A streaming processor may have a single streaming input and a single streaming output in some embodiments. The streaming processor may manipulate packets and/or associated meta data. One or more streaming processors may define a slice 1122 such as previously described.

One or more streaming hubs 1112. A streaming hub may have a plurality of streaming inputs and outputs. A streaming hub may perform one or more of multiplexing, buffering and flow control functions.

The one or more streaming processors 1114 and one or more streaming hubs 1112 may provide a streaming core 1120. At the edge of the streaming core are streaming ports through which packets and control packets enter and exit the streaming core. These ports may connect to one or more of the MAC layers, the host interface, the MC and external accelerators.

A first streaming hub 1112 may be arranged to output to a MAC transmission interface 1116. The first streaming hub 1112 may be arranged to receive an output from one or more of the slices 1122. The first streaming hub may be arranged to provide an output to a second streaming hub 1112.

The second streaming hub 1112 may be arranged to provide an output to one or more of a DMA adaptor 1110 and a data path accelerator port.

A third streaming hub 1112 may be arranged to receive from a MAC reception interface 1118. The third streaming hub 1112 may be arranged to provide an output to one or more of the slices 1122.

A fourth streaming hub 1112 may be arranged to receive from the DMA adaptor 1110. The fourth streaming hub 1112 may be arranged to provide an output to one or slices 1122 and/or to a processor accelerator port.

The DMA adaptor 1110 is arranged to receive data from and provide data to a DMA function 1108. The DMA function may be implemented by queue pairs in some embodiments. The DMA function provide data to and receives data from an interface 1102. The interface puts data onto a bus 1100 and/or receives data from the bus. The bus is provided between the network interface device and the host.

A MC 1106 as discussed previously is provided. The MC will output packets to the interface and receive packets from the interface.

An application processor App CPU 1104 may be provided which will output packets to the interface and/or receive packets from the interface.

As discussed previously, a slice is a set of components connected in sequence that may for example implement various functions within a data path. A slice may be instantiated multiple times in order to provide sufficient bandwidth.

In some embodiments, data path buses carry network packets and control packets. At the start of every control packet and/or network packets are meta data fields.

Some metadata fields are common to all packets (for example fields related to routing), others differ by packet type and some may vary according to location within the data path.

Network packets may comprise metadata, followed by frame data and an FCS.

Control packets may comprise meta data and a sequence of control messages. Each control message is addressed to a particular data path component, and other components pass the messages through without modification. Control messages can be used to update data path configuration, and/or to read configuration, telemetry and/or other state.

In some embodiments, network packets or control packets entering, leaving, and traversing, the streaming subsystem are accompanied by metadata. The metadata may be appended to the front of the packet.

The metadata may fulfil one or more of the following functions:
1) Facilitate packet routing through the streaming subsystem;
2) Facilitate external kernel or other such component with streaming interface integration by supporting mapping between the internal (inside the streaming subsystem) routing and external kernel with streaming interface top-level fabric routing;
3) Support dynamic nature of plugin-socket interfaces;
4) Identify packet as belonging to certain data flow; and
5) Hold transient processing context pertaining to the packet.

As mentioned previously, the packets propagating through the streaming subsystem are subdivided into: data packets and control packets.

The metadata may be fixed in size in some embodiments and variable in size in other embodiments.

The metadata may have:
1) Common structure

This may facilitate network interface device streaming subsystem routing and external kernel with streaming interface routing, socket support, flow identification 2) Context structure This carries transient packet context The network packet and control packets may have different metadata formats as described below.

One or more of the following fields may be provided in the metadata of a network packet:

Common structure:
  Type of packet;
  Flow identity ID;
  external kernel with streaming interface routing:
  Half routing; and
  Context type.
Context structure:
  Context The type of packet field will indicate that the packet is a network packet.

The flow identity field will indicate the flow to which the packet belongs. This field may be populated by the packet source. This field may be overwritten (possibly a plurality of times) during packet processing by slices. The meaning of this field may differ at different stages of packet processing. For example, packets arriving/leaving the streaming subsystem via the ingress/egress DMA port may use this field to identify the DMA queue. Likewise, packets arriving/leaving the streaming subsystem via one of the ingress/egress network ports may use this field to identify a priority channel. The flow ID does not affect routing through the streaming subsystem. The flow ID may affect packet processing by the slices and determine whether a socket forwards the packet to its egress port or passes the packet through without forwarding.

The external kernel with streaming interface field may be left blank by the source and may be populated by the slice if the packet is directed to an egress port connected to external kernel with streaming interface top-level fabric. The routing information may be used to determine the packets destination.

The half routing field may have one or more of a buffer ID and a port ID. The field may be populated by the source and may be overwritten by the data path. The port ID identifies a respective port and the buffer ID identifies the buffer associated with the port, for the respective slice.

The context type identifies the format of the metadata context field.

The context may be the variable portion of the metadata. This field may be initialized by the source and may be modified by one or more or each processing stage of the slice and/or by kernel(s) attached to active slice sockets. This part of the metadata may carry transient packet processing context.

The control packet metadata may have one or more of the metadata fields initiated by have one or more of the following fields:

Common structure:
Type of packet;
Flow identity ID;
external kernel with streaming interface routing;
Full routing;
Target selection;
Socket behaviour; and
Control packet type.

The type of packet field will indicate that that the packet is a control packet.

The flow identity field and/or the external kernel with streaming interface routing field may be as described with reference to the network packet field.

The full routing field may specify an end-to-end streaming subsystem path. For example, the field may specify one or more of an ingress port ID, an ingress buffer ID, an egress port ID and an egress port ID. The control packets may specify an end to end streaming subsystem itinerary (i.e. ingress port to ingress buffer to slice to egress buffer to egress port). The routing fields may be initiated by the control packet source. In some embodiments, this field may not be overwritten by the data path slices The target field may specify the packet target. The actions defined by the packet payload may apply to this target. The targets may be slice submodules such as discussed previously or a virtual port socket. In some embodiments, if the target is a virtual socket or a plugin socket, then the packet by may be seen by the respective user kernel behind the socket.

The socket behaviour field, if the control packet is directed to the specific plugin-socket identified by the target selection field, modulates socket behaviour during control packet execution. This field may controls how the socket transports the control packet.

One or more of the following configuration control packet actions may require special socket behaviour:
change the plugin-socket state;
change the plugin-socket flow mask; and
bring up teardown kernel(s) behind the plugin-socket.

The control packet type field may identifies the type of control packet. As described previously, the control packet may be a configuration packet or a barrier packet. In some embodiments, there may be a plurality of different types of barrier packets. In some embodiments, there may be a plurality of different types of configuration packets.

A streaming barrier packet may be produced by an ingress port, possibly excluding socket ports. A streaming barrier packet may be consumed by any egress port possibly excluding socket ports. A streaming barrier packet may traverse the streaming subsystem end to end.

A slice barrier packet may be produced by a slice ingress bus converter. A slice barrier packet may be consumed by slice egress bus converter. A slice barrier packet may traverse the selected slice instance only.

A configuration barrier packet may be produced by a streaming processor ingress configuration engine. A configuration barrier packet may be consumed by a streaming processor egress configuration engine. The configuration barrier packet may traverse a selected slice submodule. The configuration barrier packet may be used inside the streaming processors to communicate between two halves of configuration engines.

A data path configuration packet may be produced by the MC via a DMA host to network interface device port. The data path configuration packet may be consumed by the MC via a DMA network interface device to host port. The configuration packet traverses the streaming subsystem from ingress to egress streaming subsystem DMA port. This configuration packet may only originate from MC DMA queues in some embodiments. The configuration packet may act on matching (per control packet payload) data path blocks, sockets, and/or plugin kernels behind sockets.

A virtual port configuration (request) packet may be produced by the MC via a DMA host to network interface device. The virtual port configuration (request) packet may be consumed by the virtual port kernel(s). This may be the request half of a virtual port control packet flow. The MC may crate these packets to reach kernel(s) behind a streaming subsystem virtual port.

A virtual port configuration (response) packet may be produced by the virtual parts. The virtual port configuration (response) packet may be consumed by the MC via a DMA network interface device to host. This is the response half of virtual port control packet flow. The virtual port kernel(s) create the control packets and inject them into the streaming subsystem. They will arrive to the targeted MC-owned DMA queues.

The barrier packet may comprise a DP (data path) opcode which may specify the slice action when the slice passes this barrier packet through. The action may be to do nothing. In some embodiments, the action may be to emit a barrier counter engine command, or the action may be any other suitable action.

The configuration packets may be used to perform one or more of the following tasks:
Inline atomic configuration and control of the data path components;
Inline atomic configuration and control of plugin kernels accessible via plugin-socket interfaces;
Inline atomic configuration and control of application kernels accessible via virtual port socket interfaces; and
Inline atomic collection of data path status and state.

For example, counters may be requested and returned via one or more configuration packets. Counters may alternatively or additionally be requested via a configuration packet but a response may be returned via a DMA queue.

Configuration packets are may be generated and consumed by streaming subsystem clients. The configuration packet may be considered to be a streaming subsystem packet.

Data path configuration packets may be used to control/configure data path blocks (including plugin-sockets), control/configure plugin-kernels, and request/collect counter statistics.

The MC may place the configuration packets to be sent into its queues and may mix the packets with network packets. The MC populates the metadata such that the packets are routed from the MC through the desired data path slice and back to the MC.

The configuration packet payload may describes one or more of the following actions:
read and/or write the slice registers;
read/write tables; and
request and collect the slice's statistics counter values.

A single control packet can perform a plurality actions. It should be appreciated that all accesses by the same packet may only target one slice sub-block or one statistics engine instance or one virtual kernel at a time.

All actions performed by a single configuration packet may be performed atomically with regard to packet flow i.e. after the packet(s) that preceded the packet but before the packets that followed the packet as seen by the packet's target.

If the configuration packet performs write operations, the write data is carried inside the packet. If the configuration packet performs read operations the packet contains free space for the read data. The packet can perform a mixture of reads and writes.

The configuration packet metadata specifies the end-to-end route through the streaming subsystem i.e. the source, the destination and the specific route that takes the packet through the slice.

The configuration packet metadata identifies the specific slice sub-module instance or slice statistics engine instance or a socket or the like as the packet's target.

When a configuration packet reaches its intended target, the target performs all the actions encoded in the packet's payload in order. The packet is updated with completion status for each action (which may include the read data). The packet then continues along its path until it reaches the specified destination.

The configuration packet body may comprise one or more messages, where each message encodes one action. An action may be a read or a write of a register (possibly masked), of a table entry, and/or of a block of registers/table entries. Each message may carry one or more of the opcode, address, mask, length, write data or space for read data, and the space for action completion status (e.g. success or failure).

A barrier control packet may be used for one or more of DMA queue shut down, error recovery, run time scheduler reconfiguration and/or the like. A barrier packet may be transparent to the streaming subsystem itself. A slice may pass barrier packets through unchanged.

In some embodiments, the injection of a barrier configuration packet may use a credit mechanism. The scheduler may subtract one credit from an appropriate destination component. The barrier packet may then be output immediately at a next packet boundary.

In some embodiments, a control packet may be used to add a plug in component into a data path. The plug in component may be provided with an associated plug in socket.

One or more other components may alternatively or additionally be associated with a socket. The socket may in some embodiments be a virtual socket.

In some embodiments, the socket may be configured to provide a check with respect to the control packets. In particular, a socket may account for the control packets. The control packets are not consumed by the component associated with socket but are instead forwarded to the next component on the data path or routed back to the MC. The socket may ensure that the number of control packets which are received by the socket is the same as the number of packets which are passed to the next component on the data path.

In some embodiments, this may be a simple comparison of control packets in and control packets out.

More simply, a socket may simply confirm that a control packet which input to the component is output by the component. A loss of a packet may be considered as an error. An alert may be sent to the MC in such a case.

In other embodiments, there may be a check to ensure that a particular control packet which is received is also output.

In some embodiments this may be achieved by storing in a buffer or the like at least a part of the control packet when it is received. This may be an immutable part of the control packet or the whole control packet. When that same control packet is passed to a next component, the stored part of the control packet may be removed from the buffer and/or an indication may be stored to indicate that the same control packet has been output to the next component. A comparison may be made between the at least a part of the stored part of the control packet and the corresponding part of an output control packet to determine if the output control packet is the same as the received control packet. The comparison may exclude or ignore the mutable parts of the control packet.

In other embodiments, a hash of at least a part of the control packet may be generated and stored in a buffer or the like, when the control packet is received. When the control packet is to be output, a hash is generated with respect to the corresponding part of the output control packet. The hash may be generated with respect to at least a part of the immutable part of the control packet. The hash of at least a part of the input control packet is compared to the hash of at least a part of the output control packet to determine if a control packet has been received and output. When that same control packet is passed to a next component, the stored hash may be removed from the buffer and/or an indication may be stored to indicate that the same control packet has been output to the next component.

In embodiments, if the socket determines that one or more control packet which has been received has not been output, the socket will send an alert to the MC indicating this.

In embodiments, if the socket determines that one or more control packet is output but which does not correspond to an input control packet, the socket will send an alert to the MC indicating this. This may be indicative of a malfunction of the component or possibly a malicious attack. The socket may return the control packet in question with the alert or identification information associated with the control packet In some embodiments the external kernel may have a streaming interface. For example, the network interface device may be streaming into the external kernel, for example via a direct bus and metadata. Alternatively the network interface may be streaming into memory which the external kern will input from. Alternatively, the network interface device will stream into host memory which a host application or external network interface device kernel will input from. It should be appreciated that in the previous examples, reference has been made to the input of the external kernel. It should be noted that alternatively or additionally, this may also apply to the output of the external kernel such as streaming into the network interface device.

Optionally the external kernel may provide an output into the streaming subsystem or a different output, for example to another external kernel or the like. The external kernel may not understand the control packets and/or may operate in accordance with a different protocol to the streaming subsystem. Accordingly, in some embodiments, a socket wrapper may be configured to manage the control packets. For example, when the control packet is received by the socket, the socket wrapper may be configured to inspect the control packet and determine what actions is required. For example, the external kernel may need to be configured and/or to provide data and/or pass on the control packet. The socket wrapper will cause the external kernel to be configured and/or to provide the data. The socket wrapper may manage the output control packet. For example, the socket wrapper will ensure that the control packet is provided in correct position with respect to one or more other packets which may be control packets and/or network packets.

The socket wrapper is configured to understand the semantics of the control packets and the semantics of the external kernel.

The socket wrapper may take any command in the control packet and convert that command into a form which is understood by the kernel.

In some embodiments, the socket wrapper may perform one or more of the instructions in a control packet.

The socket wrapper may apply control to the external kernel to ensure that the operation is implemented.

The socket wrapper may be configured to translate commands in the control packet. For example, the socket wrapper may implement control plane functions, add metadata and/or the like.

For example, in the case of barrier control packets, the kernel may not know about such packets. The socket wrapper will keep track of the barrier packet. That packet may not be fed into the kernel but the socket wrapper will inject the barrier packet into the correct position in the stream of output packets. If the barrier packet requires a change in configuration, the socket wrapper may be configured to cause the kernel to change its configuration and the timing of that change.

For example, a control packet may require the external component to perform a particular operation on a particular connection. The socket wrapper may extract the packets from the packet flow for the particular connection and provide them to the external component which performs the particular operation. The socket wrapper will manage the output flow of packets from the socket such that the packets of the data flow remain in the correct order and the packets on which the operation has been performed by the external component are inserted into the data flow in the correct order. The socket wrapper may be provided with one or more buffers to support this function.

It should be appreciated that in the case of the packets being backed up in the buffer (or vice versa), the socket may send a request for the packet rate to be slowed down to a scheduler. An example of such a flow control mechanism is described below.

It should be appreciated that any other component, external or otherwise may be treated in the same way or a similar way to the external kernel as previously described.

A data flow may have one source and may have one or more destinations. From the scheduler's perspective the flow sources and destinations may be memory resources holding data to be sent or space for the data to be received.

Figure 12:
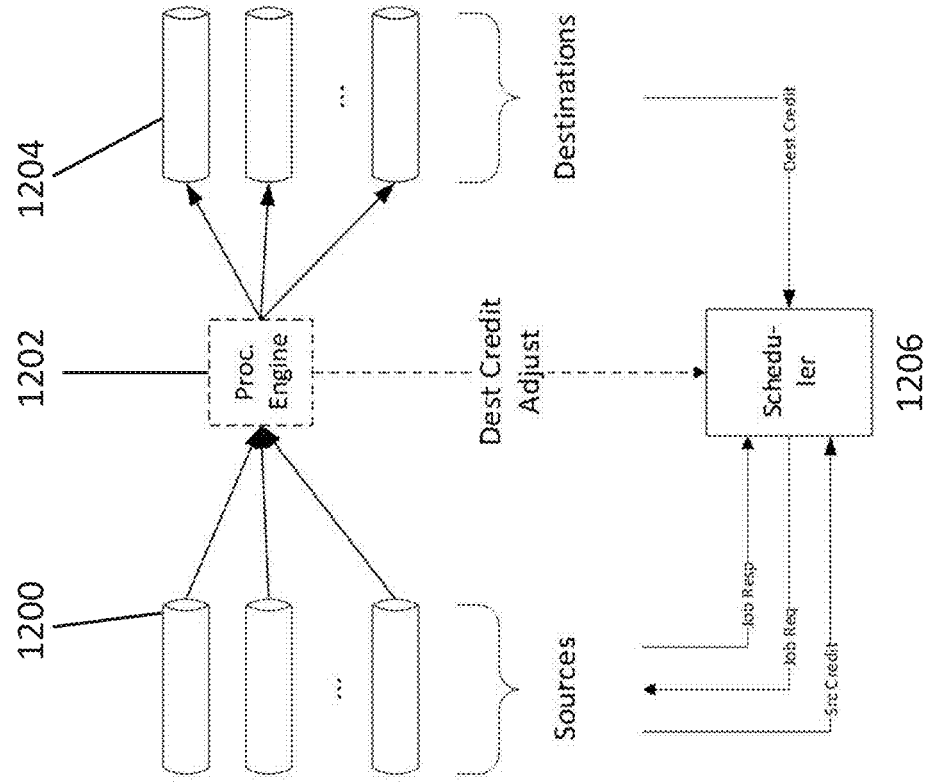
FIG. 12 schematically shows a flow control mechanism of some embodiments.

Reference is made to FIG. 12 which schematically shows a scheduling mechanism. A flow source 1202 communicates to the scheduler 1206 the amount of data it contains and wishes to output. This flow source state may be referred as a number of source credits. The flow destination(s) communicate to the scheduler the amount of free space available to receive the data. This flow destination state may be referred as a number of destination credits. The sources are schematically represented by reference 1200 and the destinations by reference 1204.

Alternatively or additionally, a socket (for example the external kernel previously described) of a flow destination can send a congestion message to request that the scheduler adjust the rate of data. In some embodiments, a default data rate may be provided for a data slice. The default data rate may be wire speed rate.

A separate scheduler instance may manage a certain related set of sources, destinations, and the flows linking them together. Both the sources and the destinations within the scheduler's scope continually send credit messages to the scheduler.

The scheduler's internal configuration and programming specifies how flows are related to the sources and the destinations. The relationship between flows and sources/destinations may be predetermined and may be known in advance in order for the scheduler to operate. The mapping may not change from packet to packet. The relationships may be changed for example during run time reprogramming.

Based on the state of the flow sources and flow destinations the scheduler determines which flows are eligible to transfer data. The scheduler evaluates all eligible flows in accordance with its programming, chooses the highest priority flow and instructs the flow-source to transmit a block of data. The scheduler may updates its internal state reflecting the job issued, which affects the number of source and destination credits available and the priority relationship of the flows.

The scheduler continuously issues job requests so long as there are any flows eligible to transfer data.

Meanwhile each source responds to the scheduler for each job issued with the actual amount of data transmitted. In some embodiments, packets passing from a source to a destination may also pass through a processing engine. A processing engine may be required if the scheduler configuration defines flows with a plurality of destinations.

When scheduling a single destination flow to transfer a block of data M-credits long, the scheduler reduces the number of source and destination credits by M.

In some embodiments, there may be an adjustment of the credits. For example, if a source has been allocated more credits than it needs, the source may send a credit message to the scheduler indicating the unused credits. The message may indicated the used credits and/or the unused credits. The scheduler will update its credit based scheduling to allocate the unused credits elsewhere.

In some embodiments a data path component may change the size of data during the processing of the data. This may be dependent on the function provided by that data path component. For example a decompression component would increase the size of the data. It should be appreciated that other functions may change the size of the data such as an encryption or decryption functions. In a pipeline, this change in size of data may require an alteration in the number of credits to maintain the flow of data through the pipeline.

The socket of a component may be configured to manage the credits. The socket may send credit messages to the scheduler to request increase or decrease the credits, as required. The credit messages sent to the scheduler may be to control the rate of flow of data in the component. The rate of flow may be speeded up or slowed down. This may be controlled by the rate at which credits are provided to the component.

The socket may be associated with a plug-in component as previously described.

Thus in some embodiments, configuration changes may be ordered with respect to the stream of network packets. Each network packet may see either the configuration prior to a given control packet, or after the control packet. Changes to two or more data path components encoded in a single control packet appear atomic to network packets.

This may simplify the design of data path components and the firmware that manages them. For example consider a case where there are two tables, with the first yielding an index into the second. With a separate control channel, when configuration changes are out-of-band, care is needed when making related changes in the two tables. In that scenario, it may be necessary to pass a barrier through the data path before reusing a freed entry for example. In contrast in some embodiments this is not necessary.

Testing may be simpler and faster in some embodiments. A test vector may be formed that consists of an interleaving of control and network packets. The configuration seen by each network packet is unambiguous and not dependent on timing. Thus the results may be deterministic, and there is no need for pauses or barriers to wait for configuration changes to be applied.

It is also sometimes desirable to make multiple changes atomically. Consider the case of transitioning a VNIC into multicast promiscuous mode. It is desirable to atomically add a multicast-all filter and remove all other multicast MAC filters. A single control packet may be sent to the required entity. In this case, that entity may be the "filter table". The filter table would interpret the control packet and implement the combined operation with the required atomicity constraints. In this embodiment, the effect of removing and adding some filters may be viewed as a single operation with respect to all data flowing through the filter table.

In some embodiments, all components requiring configuration may need to be reachable via the data path from all agents that apply configuration, and vice versa. For example, the MC may be able to transmit control packets to all data path slices, and data path slices may be able to return control packets to the MC.

It should be appreciated that in some embodiments, there may be a separate control path for some but not all components.

In some embodiments, the size of a control packet may be defined by the maximum transmission unit MTU of the data path. In other embodiments, where the data path does not reorder packets, two or more control packets may be linked. The two or more control packets may be linked such that they are not interleaved with network packets.

In some embodiments, where there are two or more control messages, two or more control messages can be combined into a packet, where a packet contains one or more messages. Each message is addressed to a component which is controllable. If there are more than one message then all the actions required by the messages are carried out atomically relative to the packet stream in which the packet is embedded.

For example, there are components C1 and C2 which have been composed (interconnected) so that packet streams are delivered to C1 then to C2 then somewhere else and a packet stream of Frames F1, . . . . FN. A packet contains the messages [M1, M2] where M1 is addressed to C1 and M2 is addressed to C2 and the meaning of M1 and M2 is M1 stop processing frames and M2 start processing frames. Then the effect of F1, F2, F3, [M1, M2], F4, F5, . . . (assuming that previously C1 was processing frames and C2 was not) is that C1 would process frames F1-3 and C2 would process frames F4 onwards. Thus the effect of the combined commands in the packet is atomic relative to the packet flow even though there are multiple connected components.

In some embodiments, it may be necessary to pass a barrier through the data path. This may for example be when tearing down resources. A barrier may be provided by a barrier control packet that does not carry any commands. For example, the barrier control packet could be passed in turn from upstream components to all downstream components for a given topology of components. Each upstream component would thus stop sending data to its downstream components in a controlled manner In some embodiments, only the MC will generate control packets. In other embodiments, one or more other agents to components may be configured to generate control packets. For example, drivers on the host or on embedded application processors could inject control packets through transmit queues TxQs, with a flag in the Tx descriptor identifying a control packet.

A hardware accelerator may configure the network interface device by sending control packets directly.

In some embodiments, where there is more than one entity which is able to configure the components on the network device, there may be lower latency and higher throughput for configuration updates than passing all such updates through the MC. This option may allow a plurality of independent initiators to request changes without forcing serialisation through the shared MC command interface.

In some embodiments, the control commands in network packets may be encoded. This may allow the control path to be accessed from unprivileged and non-driver components, such as applications on the host, and from the network.

For example, an application may configure an accelerator kernel. This option means that the MC and/or the driver of the network interface device does not have to know how to configure such accelerators. Accelerators may pose a challenge for the control plane because in many cases the host drivers and MC may not know how to configure them.

For example version 2 of Windows NDIS (network driver interface specification) RSS (receive side scaling) may require fast updates to RSS indirection tables from each RSS channel, and without locking. This may involve dedicated hardware tables which are memory mapped to the driver for each RSS channel and updates effected by a driver writing updated values to a table. If these updates need to be handled internally by the control plane then the hardware logic interfacing with the driver may construct itself the control plane messages as a result of the writes. Some embodiments may allow the network interface device to be configured to support such updates.

It should be appreciated, as shown in the above example, that there may be hardware which may not be controlled by the uniform control channel and that other mechanisms may co-exist to support such hardware.

Control packets may be used for dynamic discovery of components on the data path. For example the MC may generate control packets to probe any accelerators provided by the network interface device. The MC may be informed by a language runtime (which is in the process of for example re-reprogramming an FPGA region where a one or more accelerators are or have been provisioned). In some embodiments, this may be achieved by one or of:
  a wildcard address matched by all components;
  a known probe command handled by all components; and
  a hop count where each component decrements the hop count and only processes the command if it reaches zero.

The control packet encoding may be of any suitable format. The format of the metadata word may be shared as far as possible with network packets.

The metadata word of control packets may comprise one or more of:
  a field indicating whether a packet is a control packet or a network packet. This may be provided in some embodiments by a single bit. In other embodiments, this may be provided by a plurality of bits;
  a routing field to control the path that the packet takes through the data path. This may define the order that the packet takes through the data path, thus controlling the order in which the components are configured; and
  the rest of a control packet may comprise a sequence of control commands.

In some embodiments, the start of each control command may be aligned with respect to a particular natural binary width such as 8, 16, 32 bits.

Each control command may comprise one or more of:
  component ID—this may select the component to handle this command;
  length—this may determine where the next command starts;
  command ID—this may define what action is requested. In some embodiments there may be one or more global IDs and/or one or more IDs specific to components;
  status—this may be set to a particular value if the command is handled. This may have a different value when not yet handled. In some embodiments, the status may be set to non-zero when the command is handled; and
  body—the size and layout may depend on the component ID and/or the command ID.

In the case of read commands the body may have a region into which the component writes the requested data.

Where there are two or more data path slices a control packet may be multicast to two or more or all slices.

Alternatively, the MC may generate a control packet per slice, each of which is routed explicitly.

In some embodiments, a data path component may skip control commands with a non-zero status. This may be applied in the case where a data path has two or more components of the same type. In some embodiments, each component may have a unique ID.

Messages may be mediated by the MC driver interface MCDI. The messages may be one or more of a discovery message, an allocation message, a setup message and a tear down message. The MCDI may enforces capabilities and/or respond according to global policy. The global policy may be provided by relatively high or the highest privilege level controlling entity.

Figure 5:
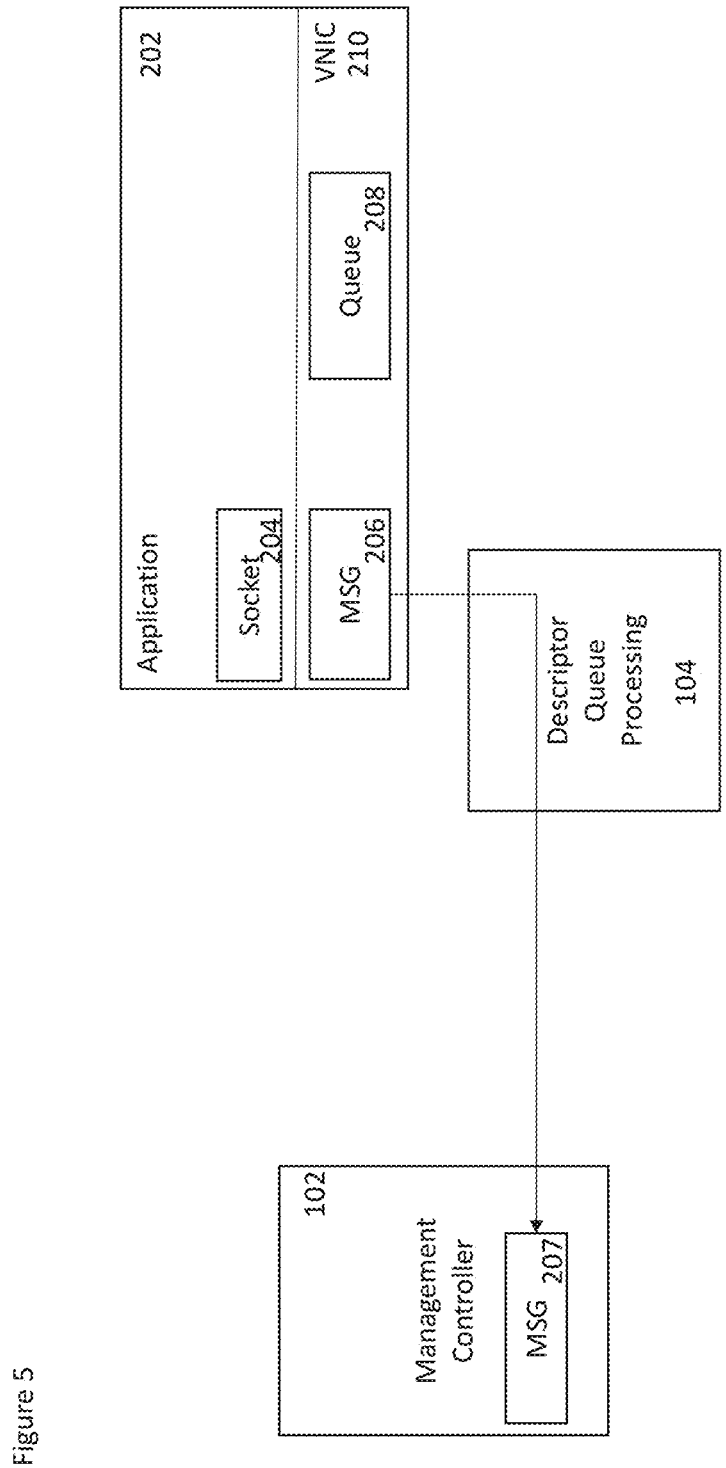
FIG. 5 schematically shows communication between an application and a management controller to cause components of the network interface device to be configured to support the application.

Reference is made to FIG. 5 shows schematically an application 202 which has a socket. A virtual NIC VNIC 210 is shown having a queue 208 and a message function 206. The MC 102 has a message function 207. In this example, the application can use the VNIC directly or a socket. If the application uses a socket, then the VNIC can exist in the address space of the application as shown in FIG. 5 or within a privileged context such as a hypervisor or operating system.

Posting a transmit descriptor to a message addressed to the MC causes the message to be transferred to the MC. Posting a receive descriptor to the queue 208 allows the MC to reply. A descriptor processing function 104 is provided. The descriptor processing function allows host software to send information "a descriptor" to the MC which corresponds to a memory location to deliver data from/transmit to and/or may contain a control word The contents of the message are interpreted by each component according to its predefined syntax and semantics. The MC 102 in this respect is the same as other components.

Figure 6:
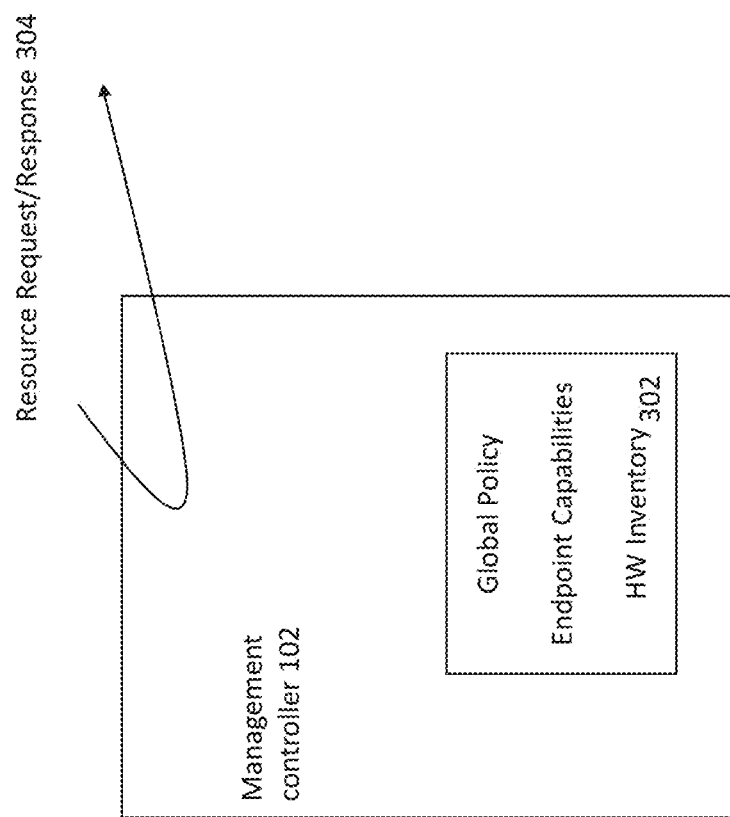
FIG. 6 schematically shows the management controller.

The API may be a RESTFul or similar API which enables operation type and semantics to be discovered. In this regard, reference is made to FIG. 6. As schematically shown in FIG. 6, the MC 102 has access to or stores information 302 such as global policy information, endpoint capabilities and a hardware inventory.

In some embodiments, the control message may be such that telemetry data or performance data may be obtained from one or more or all of the pipelines.

The management controller may be configured to allow one or more policies to be changed. In some embodiments, depending on the policy which it to be changed, this may only be done by one or more entities with a relatively high privilege. This may for example be an entity of a kernel of an operating system.

The management controller is also configured to ensure that privilege is enforced. Thus an application is only able to use resources in the network interface device which are available given a particular level of privilege. Thus applications cannot get resources allocated to which they are not entitled.

In some embodiments, the management controller may conjugate or join control messages. This may be used where more than one control message is required. These control conjugated control messages may be such that no data messages are able to enter a data path between the two or more conjugated control messages.

The MC is configured to respond to allocation requests. A resource request may be received from an application, an operating system, and a controlling application which might be host resident or authorised to send requests over a network (encrypted) control plane.

This request may be configuration or reconfiguration of one or more resources. By way of example, a request might be to one or more of allocate a particular accelerator (such as an IPSec decryption block), to join one already allocated block with another, filter a particular IP flow onto an already joined processing pipeline or any other suitable request. Based on the information, the MC is able to provide a cause the one or more components to be reconfigured or configured and to provide a response confirming that this has been done.

In some embodiments, the response may indicate a failure. This may be because the requestor was not suitably privileged and/or resources are not available The components may be a hardware unit and/or implemented by software.

Figure 7:
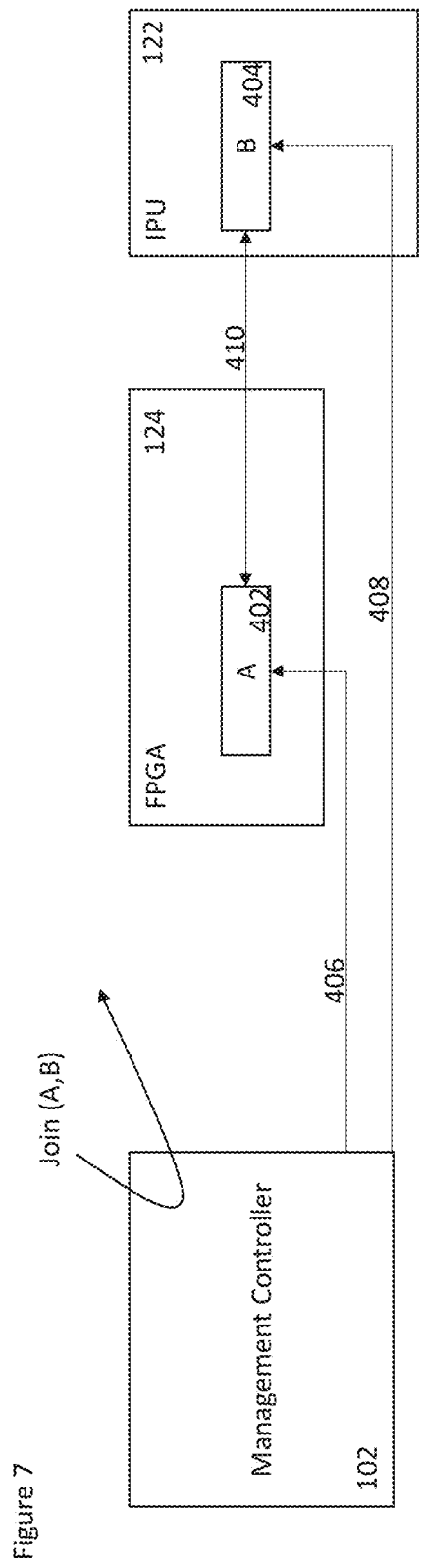
FIG. 7 schematically shows the configuration by the management controller of two components of the network interface device.

As for example shown in FIG. 7, the MC 102 is configured to respond to a join request for joining a first resource unit A 402 and a second resource unit B 404. In this example, the resource unit A 402 is provided by the FPGA 124 and the resource unit B 404 is provided by the IPU 122. The resource unit A may be a subset of the unit, for example the FPGA or the entire unit of the FPGA.

The MC is configured in response to the join request send control information 406 to the first resource unit 402 and control information 408 to the second resource unit 404.

The control information for both resource units is in the same control packet. The control packet is received first by the first resource unit and then by the second resource unit. This control information causes the configuration of the first and second resource units such that that control data and data can be sent in-band between the first and second resources. This is referenced 410.

The control information cause one or more of the creation of bus resources, allocation of resources, and allocation of network fabric.

It should be appreciated that the processing which is provided by a respective data path or pipeline may perform full processing of the data required by an application or may only provide a partial processing of the data required by an application. In some embodiments, further processing may be performed by one or more other components on the network interface device and/or on the host device.

It should be appreciated that in some embodiments, the application or at least part of an application may be running on the network interface device. The application or at least a part of the application may be off loaded to the network interface device. Thus an application may be fully or partially offloaded to the network interface device.

It should be appreciated that one or more of the components on the network interface, such as for example the accelerators or the like may partially process or fully process the data. For example, the network interface device may be such that a TCP component on the network interface device is configured to partial protocol process received and/or transmitted frames. The other part of the protocol processing may be performed in a host device or by another processing function such an FPGA or CPU. The protocol processing function performed on the network interface device may be to complete the protocol processing or to start the protocol processing.

Some embodiments may be use a network processing function in a data pipeline to capture a payload which is pushed to a neural network component. That neural network component may process the received data but without attempting a classification. The classification may be performed by another processing function on the network interface device or on the host device.

It should be appreciated that the management controller may insert or remove components into a pipeline.

It should be appreciated that one or more components on the network interface device may be reserved. The components may be reserved for particular functions, particular applications and/or functions at a given level of privilege. In some embodiments, a reserved component may not be controlled by the management controller or the management controller may only be able to perform limited control functions with respect to such a reserved component.

Figure 8:
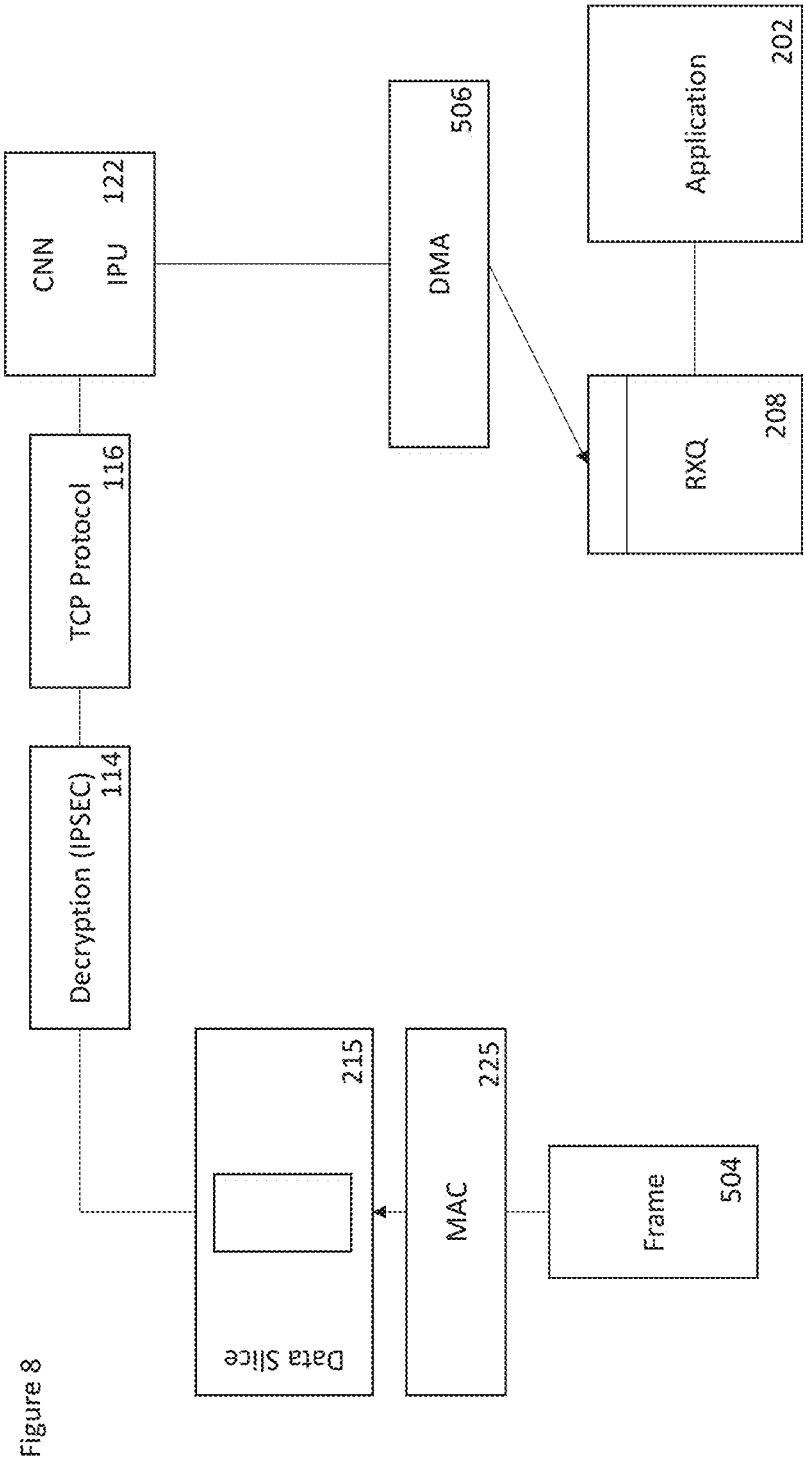
FIG. 8 shows an example of a data path provided in the network interface device to support an application.

Reference is made to FIG. 8 which schematically illustrates the processing of a frame. It should be appreciated that to provide this data path, the control packet setting up this data path will have traversed the individual components in the same order to cause each component to be configured as required.

A frame 504 is receive at the MAC interface 225.

After MAC processing, data from the frame 504 is input into a data slice 215. This data may be processed by a receive slice. The receive slice may perform any suitable processing. In this example, the data slice parses the data flow, removes virtual extensible LAN (VxLAN) encapsulation and performs tunnelling offload. The data slice may provide switching.

It should be appreciate that the functions provided by a slice are by way of example only and a data slice may alternatively or additionally be configured to perform different functions.

The processed data is output by the data slice to the decryption function 114 which decrypts the data.

The decryption function 114 is configured to output the decrypted data to the TCP protocol procession function 116 which is configured to perform TCP reassembly.

The output of the TCP protocol processing function is in the form of payload byte stream. This byte stream is provided by a convolutional neural network CNN is configured to be provided to a convolutional neural network function provided by the IPU 122.

The machine learning output is provided to a DMA function 506 which stores the data in memory and provides an entry to a receive queue RXQ 208.

The application 202 will then consume the data.

In some embodiments, the data path may have to decrypt twice. For example, IPsec is a tunnelled protocol using for example NVGRE (Network Virtualization using Generic Routing Encapsulation) needs decrypting before parsing a flow which itself uses the TLS (transport layer security) protocol which also requires decryption.

On the transmit side, this would require two separate encryption operations.

The operational parameters for each unit may be set by the host application posting messages to each or any unit using their internal address. These messages may be of a similar structure to the messages used to "join" the units but instead may instead configure or control already joined units.

The design of the network interface device block may have two or more slices/pipes (M) for data-paths which may be multiplexed with one or more MACs to create physical Ethernet ports and one or more host bus interfaces (e.g. PCI functions). The physical implementation of a system on chip SOC may comprise 1 . . . N physical dies where each die contains a network interface block. Some embodiments may, at run time dynamically bind (or compose) together slices with MACs and host interfaces from any combination of the network interface blocks to form 1 . . . (N*M) logical network interfaces which are presented to the host operating system as different logical devices. In this regard, reference is made by way of example only to FIG. 9.

Figure 9:
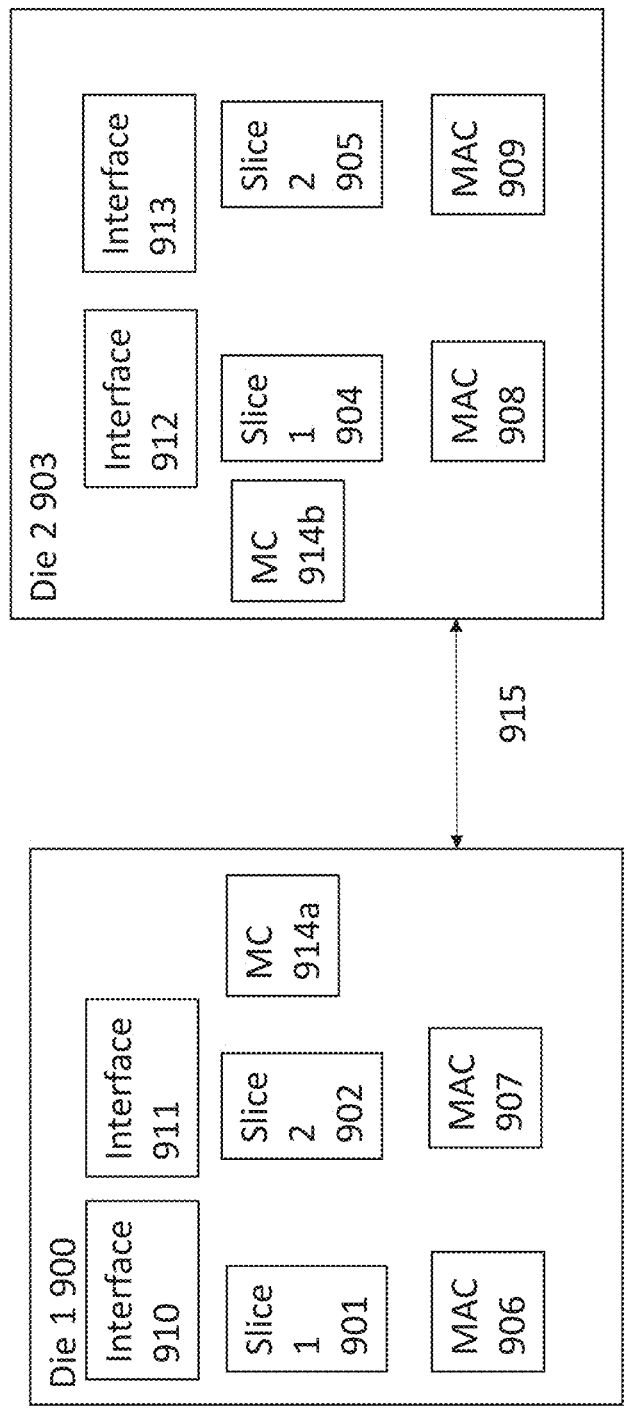
FIG. 9 shows an arrangement where the network interface device has two dies.

As shown in FIG. 9, there is a first die, die 1 which is referenced 900 and a second die, die 2 referenced 903. Each die is shown as having a first slice, slice 1, and a second slice, slice 2. For die 1, these slices are respectively referenced 901 and 902 and for die 2, these slices are respectively referenced 904 and 905.

The first die is shown as having a first interface 910 and a second interface 911 and the second die is shown as having a first interface 912 and a second interface 913.

The first die is shown as having a first MAC function 906 and a second MAC function 907 and the second die is shown as having a first MAC function 908 and a second MAC function 909.

A management controller is provided to cause the required data paths to be set up. The management controller may be as previously described. The management controller may be provided in any suitable location. For example a management controller may be provided on one of the dies such as die 1 or die 2 or both dies. In this example, the management controller is provided on both dies. The management controller on the first die is referenced 914a and the management controller on the second die is referenced 914b. The management controllers on the two dies may coordinate one with the other. It should be appreciated that where there is more than one management controller, one management controller may be a master controller with one or more other management controllers acting as slaves. Alternatively, where there is more than one management controller, the management controller can coordinate as a distributed peer-peer system.

The management controller is configured to output control messages onto the data path which is schematically represented by referenced 915 which is provided between the dies. The data path in practice is also provided in the respective dies, although this is not shown for clarity.

By way of example only, a data path can be set up which comprises the first interface 910 of the first die, the second slice 902 of the first die and the first MAC function 908 of the second die. Another example might be where a data path comprises the second interface of the second die, the second data slice 902 of the first die and the first MAC function 908 of the second die. In some embodiments, a data path may comprise any one of the four interfaces with any one of the four slices with any one of the four MAC functions. One or more of the interfaces, slices and MAC functions may be used in more than one data path.

It should be appreciated that in some embodiments, there may be a single die. In other embodiments there may be more than two dies. Where there is more than one die, a management controller may be provided on one, some or all of the dies.

In the example shown in FIG. 9, each die is shown as supporting two slices. It should be appreciated that this is by way of example only and some dies may support more than two slices or less than two slices. It should be appreciated, that in some embodiments, different dies may support different number of slices. In a dynamically configurable die, there may be different numbers of slices at different times. The number of slices supported may be dependent on the complexity of one or more of the slice and/or loading of the network interface dies.

Likewise the number of MAC functions supported may be more or less than two MAC functions. It should be appreciated, that in some embodiments, different dies may support different number of MAC functions.

Likewise the number of host interface functions supported may be more or less than two host interface functions. It should be appreciated, that in some embodiments, different dies may support different number of host interface functions.

In the example shown, there is a one to one ratio between the number of slices, network interface function and MAC functions. This is by way of example only and in other scenarios, there may be no such ratio. For example a MAC function may be used by one or more data slices. A network interface function may be used by one or more data slices.

In the example shown, each die is provided with a network interface, a MAC function and a data slice. It should be appreciated that a die may be provided with one, two or all of a network interface, a data slice and a MAC function.

In the example shown in FIG. 9 there are two dies. This is by way of example only, and in other embodiments, more or less than two dies may be provided.

In the example shown in FIG. 9, each slice is shown as being on a single die. This is by way of example only and in some embodiments, a slice may be supported by more than one die. In some embodiments, at least one slice may be supported by two or more dies. In some embodiments, one or more of the dies may be provide a processing function such as an FPGA and/or any of the other processing functions previously described.

In some embodiments, a slice may be regarded a processing engine. In some embodiments a slice may be regarded as a frame processing engine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A network interface device comprising:
    a plurality of components arrangeable in an order to form a data path for processing a flow of data according to the order; and
    a control component configured to provide a control packet to the plurality of components, wherein the control packet includes one or more control messages to change a configuration of components of the plurality of components when arranged in the order, wherein the control component is configured to provide the control packet in the flow of data to be processed by the plurality of components such that the plurality of components receive the control packet according to the order of the plurality of components of the data path, wherein:
        the plurality of components in the flow are configured to output the control packet after the components of the plurality of components are reconfigured according to the control packet;
        and the control component is configured to receive the control packet output by the plurality of components.

2. The network interface device as claimed in claim 1, wherein each of the components of the plurality of components is configured to update its configuration in response to the one or more control messages such that data received after the one or more control messages in the flow of data is processed by the component with its updated configuration.

3. The network interface device as claimed in claim 1, wherein at least one control message of the one or more control messages is configured to cause the plurality of components to define a data pipeline for a respective flow of data, the data pipeline comprising the plurality of components in the order.

4. The network interface device as claimed in claim 3, wherein the at least one control message is configured to cause one of creation and configuration of interconnect resources between at least two of the plurality of components to define a data path between the at least two components of the data pipeline.

5. The network interface device as claimed in claim 1, wherein the control component is configured to cause one or more request control messages to be output which are configured to cause at least one of the plurality of components to provide status information in response thereto.

6. The network interface device as claimed in claim 5, wherein the status information is provided in the control packet and/or a receive queue for the control component.

7. The network interface device as claimed in claim 1, wherein at least one control message of the one or more control messages is configured to cause creation of bus resources, allocation of one or more components to a data path, and/or allocation of one or more interfaces.

8. The network interface device as claimed in claim 1, wherein the plurality of components comprises one or more of a field programmable gate array (FPGA), a central processing unit (CPU), a graphics processing unit (GPU), and an intelligence processing unit (IPU).

9. The network interface device as claimed in claim 1, wherein at least one of the plurality of components comprises a component having a socket configured to receive the control packet and to output the control packet.

10. The network interface device as claimed in claim 9, wherein the socket is configured to determine that at least a part of a received control packet is the same as a corresponding part of an output control packet.

11. The network interface device as claimed in claim 9, wherein the socket is configured to determine that, for a respective control packet that is received by the socket, the respective control packet is output by the socket.

12. The network interface device as claimed in claim 9, wherein the socket is configured to determine that a number of received control packets is the same as a number of output control packets.

13. The network interface device as claimed in claim 9, wherein the socket is configured to store at least a part of a respective control packet received by the socket and to compare a corresponding part of an output control packet to the stored at least a part of the respective control packet to determine that the respective control packet is received and output.

14. The network interface device as claimed in claim 9, wherein the socket is configured to store a hash of at least a part of a respective control packet and to compare a hash of a corresponding part of an output control packet to the stored hash to determine that the respective control packet is received and output.

15. The network interface device as claimed in claim 9, wherein the socket is configured to determine a discrepancy between at least a part of a received control packet and a corresponding at least a part of an output control packet and, in response to the discrepancy, generate and output an alert.

16. The network interface device as claimed in claim 9, wherein a socket wrapper of the socket is configured determine if a respective control packet comprises one or more instructions for the at least one component and if so, to cause the one or more of instructions to be performed.

17. The network interface device as claimed in claim 16, wherein the socket wrapper is configured to perform the one or more instructions for the at least one component.

18. The network interface device as claimed in claim 16, wherein the socket wrapper is configured to cause the at least one component to perform the one or more instructions.

19. The network interface device as claimed in claim 16, wherein the socket wrapper is configured to provide one or more messages to a scheduler to cause a rate of packets received by the socket to be increased or decreased.

20. The network interface device as claimed in claim 17, wherein the socket wrapper is configured to determine that a respective control packet is to be output by the at least one component and to inject the respective control packet into a defined position within a flow of packets output by the socket.

21. A method in a network interface device comprising:
providing a plurality of components arrangeable in an order to form a data path for processing a flow of data according to the order;
providing, by a control component, a control packet to the plurality of components, wherein the control packet includes one or more control messages to change a configuration of components of the plurality of components when arranged in the order, wherein providing the control packet comprises providing the control packet in the flow of data to be processed by the plurality of components such that the plurality of components receive the control packet according to the order of the plurality of components of the data path;
outputting, by the plurality of components in the flow, the control packet after the components of the plurality of components are reconfigured according to the control packet; and
receiving, by the control component, the control packet output by the plurality of components.

22. The method as claimed in claim 21, comprising, updating, by each of the components of the plurality of components, a respective configuration in response to the one or more control messages such that data received after the one or more control messages in the flow of data is processed by the component with its updated configuration.

23. The method as claimed in claim 21, comprising causing the control component to output one or more request control messages, the one or more request control messages configured to cause at least one of the plurality of components to provide status information in response thereto.

24. The method as claimed in claim 23, wherein the status information is provided in the control packet and/or a receive queue for the control component.

25. The method as claimed in claim 21, wherein the method further comprises:
receiving, by a socket of at least one of the plurality of components, the control packet; and
outputting, by the socket, the control packet.

26. The method as claimed in claim 25, comprising:
determining, by the socket, that at least a part of a received control packet is the same as a corresponding part of an output control packet.

27. The network interface device of claim 1, wherein at least one of the plurality of components comprises a processing circuit.

28. The network interface device of claim 1, wherein at least one of the plurality of components comprises a streaming processor.

29. The network interface device of claim 1, wherein at least a part of the control packet outputted by the plurality of components is different from the control packet provided to the plurality of components.

30. The method of claim 21, wherein receiving the control packet output by the plurality of components comprises receiving a control packet that differs in part from the control packet provided by the control component to the plurality of components.

* * * * *